(12) United States Patent
Vacek

(10) Patent No.: US 11,288,973 B2
(45) Date of Patent: Mar. 29, 2022

(54) UNMANNED AERIAL SYSTEM AUTOMATED THREAT ASSESSMENT

(71) Applicant: University of North Dakota, Grand Forks, ND (US)

(72) Inventor: Joseph James Vacek, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 148 days.

(21) Appl. No.: 16/553,826

(22) Filed: Aug. 28, 2019

(65) Prior Publication Data

US 2021/0065564 A1    Mar. 4, 2021

(51) Int. Cl.
*G08G 5/00* (2006.01)
*G06K 9/62* (2022.01)
*G06N 3/08* (2006.01)
*G05D 1/00* (2006.01)
*B64C 39/02* (2006.01)
*G05D 1/12* (2006.01)

(52) U.S. Cl.
CPC ......... *G08G 5/0082* (2013.01); *B64C 39/024* (2013.01); *G05D 1/0088* (2013.01); *G05D 1/12* (2013.01); *G06K 9/6259* (2013.01); *G06K 9/6263* (2013.01); *G06N 3/08* (2013.01); *B64C 2201/12* (2013.01); *G06K 2209/21* (2013.01)

(58) Field of Classification Search
CPC ............... G08G 5/0082; B64C 39/024; B64C 2201/12; G05D 1/0088; G05D 1/12; G06K 9/6259; G06K 9/6263; G06K 2209/21; G06N 3/08
See application file for complete search history.

(56) References Cited

U.S. PATENT DOCUMENTS

| | | | | |
|---|---|---|---|---|
| 10,866,597 | B1 * | 12/2020 | Reinhold | G05D 1/12 |
| | | | | 701/3 |
| 10,907,940 | B1 * | 2/2021 | Parker | F41H 11/02 |
| | | | | 235/400 |
| 11,074,822 | B2 * | 7/2021 | Ziemba | G08G 5/0069 |
| 2016/0328983 | A1 * | 11/2016 | Hutchinson | G08G 5/045 |
| | | | | 701/26 |

(Continued)

*Primary Examiner* — Thomas G Black
*Assistant Examiner* — Brittany Renee Peko
(74) *Attorney, Agent, or Firm* — Schwegman Lundberg & Woessner, P.A.

(57) ABSTRACT

The present subject matter provides various technical solutions to technical problems facing UAV detection, threat assessment, and mitigation purposes. UAV detection may be accomplished using a variety of UAV sensors and systems, which may be used in an Unmanned Aerial System Mitigation and Detection system to generate a UAV Automated Threat Assessment and a UAV mitigation solution. The UAV Automated Threat Assessment may be generated by combining input from various sensors and systems. For example, the UAV Automated Threat Assessment may selectively combine data received from geographically arranged sensors, assemble the input from those sensors using a user-adjustable artificial neural network (ANN), determine whether a potential intruding UAV is not a threat, is transiting, is loitering, or is attacking, and generates a mitigation solution output to an operator that includes an automated mitigation notification.

17 Claims, 13 Drawing Sheets

(56) References Cited

U.S. PATENT DOCUMENTS

2020/0103499 A1\* 4/2020 Preece ............... G01S 7/415
  706/12
2020/0108926 A1\* 4/2020 Smith ................ B64C 39/024
  244/110

\* cited by examiner

UNMANNED AERIAL SYSTEM AUTOMATED THREAT ASSESSMENT

TECHNICAL FIELD

Embodiments described herein generally relate to unmanned aerial vehicle detection.

BACKGROUND

An unmanned aerial vehicle (UAV) may be used for various consumer, commercial, and military purposes. UAVs provide various advantages over manned aerial vehicles, such as reduced initial and operational cost, improved maneuverability, improved operator safety, and other advantages. These improvements have significantly reduced the barriers to ownership and operation of UAVs, resulting in a significant increase in the number of UAVs operated by public and private parties. The increase in UAVs increases the need for UAV detection and mitigation.

DESCRIPTION OF EMBODIMENTS

Figure 1:
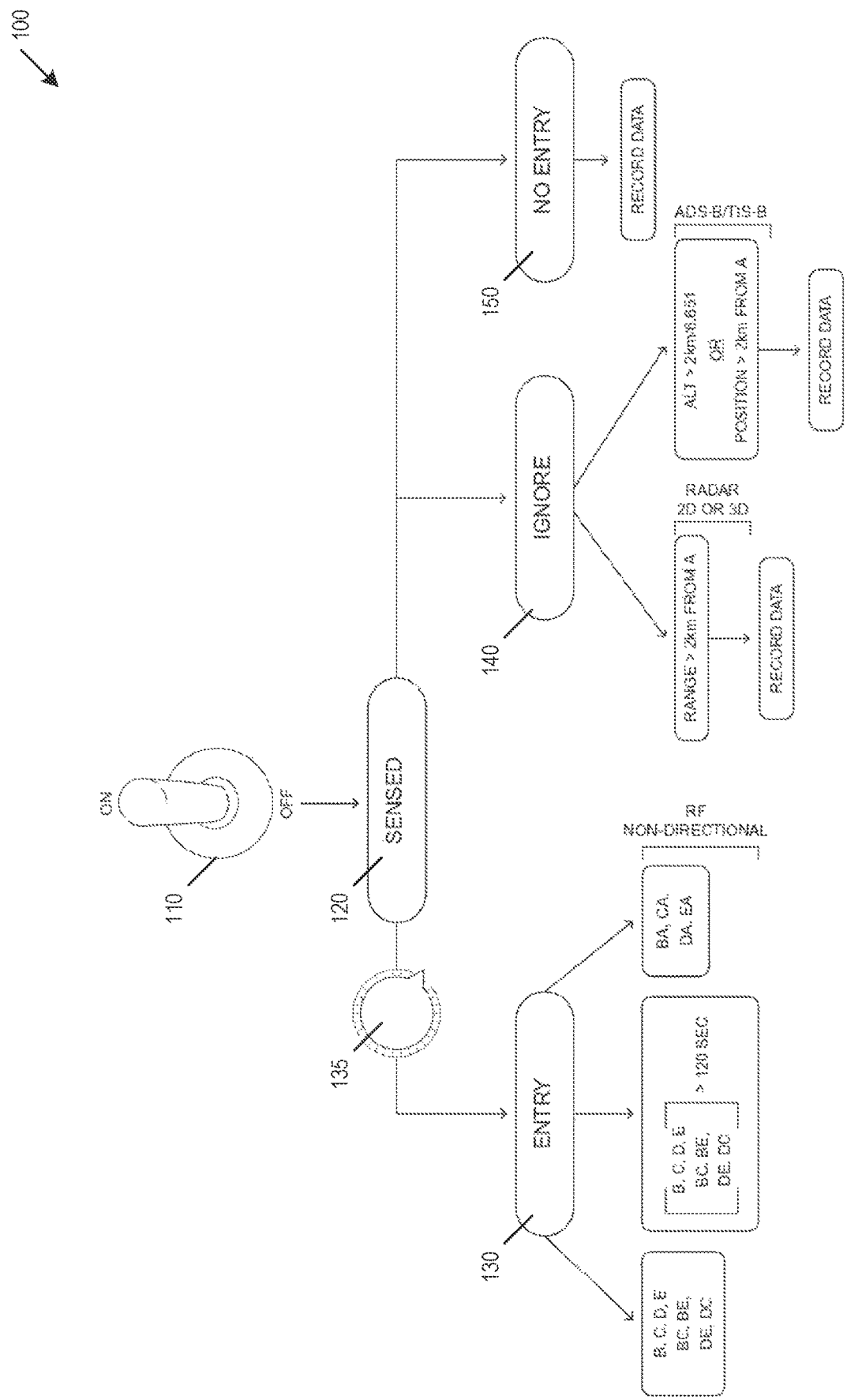
FIG. 1 is a diagram of a UAV Automated Threat Assessment, in accordance with at least one embodiment.

The present subject matter provides various technical solutions to technical problems facing UAV detection, threat assessment, and mitigation purposes. UAV detection may be accomplished using a variety of UAV sensors and systems, which may be used in an Unmanned Aerial System Mitigation and Detection system to generate a UAV Automated Threat Assessment and a UAV mitigation solution. The UAV Automated Threat Assessment may be generated by combining input from various sensors and systems. For example, the UAV Automated Threat Assessment may selectively combine data received from geographically arranged sensors, assemble the input from those sensors using a user-adjustable artificial neural network (ANN), determine whether a potential intruding UAV is not a threat, is transiting, is loitering, or is attacking, and generates a mitigation solution output to an operator that includes an automated mitigation notification. The sensors may be arranged in a variety of geographic positions surrounding a location or region intended to be protected from intruding UAVs. The output of the sensors may be combined statistically to provide data to an underlying ANN algorithm, which in turn may be used to generate an automated mitigation. The automated mitigation may include an automated response (e.g., deployment of UAV countermeasures), prompting a system operator to approve a suggested mitigation response, prompting a system operator to investigate and provide confirmation of a UAV threat, generating an automated mitigation notification, or other automated mitigation action.

The Unmanned Aerial System Mitigation and Detection system may use a variety of UAV sensors and systems, such as Radio Frequency (RF) sensors, RAdio Detection And Ranging (radar), Automatic Dependent Surveillance-Broadcast (ADS-B) data, and other sensors and systems. RF sensors may be used to identify the presence of a UAV signal. For example, an unmanned aerial system (UAS) may include UAV and a UAV control device, and RF sensors may detect signals sent to or from the UAV. The RF sensors may include a directional array of antennas (e.g., phased array) that may be used to determine a direction of a signal. The RF sensors may be separated geographically to provide additional information about the UAV position, velocity, or navigation path, which may be used in the Unmanned Aerial System Mitigation and Detection system.

An ADS-B system includes aircraft surveillance technology that periodically broadcasts the GNSS-derived position of an aerial vehicle. Air Traffic Control and other participating aerial vehicles may use the ADS-B data for safety and navigation purposes, such as by directing nearby aerial vehicles to fly at sufficiently different altitudes. A Traffic Information Services-Broadcast (TIS-B) system may be used as a ground-based supplement to the ADS-B airborne service, where the TIS-B may provide track known traffic in the Air Traffic Control System. The Unmanned Aerial System Mitigation and Detection system may use ADS-B or TIS-B data for UAV detection and mitigation, such as by separating authorized aircraft broadcasting ADS-B data from potentially threatening UAVs that are not broadcasting ADS-B data.

The Unmanned Aerial System Mitigation and Detection system may use radar or other ranging technology to detect a UAV range, direction (e.g., angle), velocity, position, and other ranging information. Radar systems may be used to provide two-dimensional (2-D) or three-dimensional (3-D) information, which may be combined with other sensors and systems to improve the determination of a UAV position, velocity, or navigation path.

Each of the sensors and systems may be used individually for detecting UAVs and assessing a threat level of an intruding UAV within the UAV Automated Threat Assessment. The use of multiple sensors and systems in combination improves the accuracy of the probabilistic outcome of each threat assessment, resulting in improved confidence in the resulting automated mitigation.

The UAV classification may include an artificial intelligence (AI) analysis of UAV characteristics. As used herein, AI analysis is a field concerned with developing decision-making systems to perform cognitive tasks that have traditionally required a living actor, such as a person. The AI analysis of UAV characteristics may be performed by an artificial neural network (ANN) algorithm using specific UAV classifiers described herein. An ANN includes a computational structure that may be loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, the value is usually not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers may not know which weights will work for a given application. ANN designers typically choose a number of neuron layers or specific connections between layers including circular connection, but the ANN designer does may not know which weights will work for a given application. Instead, a training process is used to arrive at appropriate weights. However, determining correct synapse weights is common to most ANNs. The training process proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is a diagram of a UAV Automated Threat Assessment 100, in accordance with at least one embodiment. Automated Threat Assessment 100 shows an example system operation based on decision trees. The initial state of the system is either on or off, which may be selected based on a state of a power switch 110, where power switch 110 may include a physical switch or a graphical user interface (GUI) switch. When switched on, available sensors may be receiving data or scanning for UAVs, a user interface may be displayed, and an operator may be able to see that the system is active. Various sensors will transmit sensor data to the system, and the system user interface may provide an indication of sensor status. The sensors may be arranged in an overlapping fashion, such as to provide additional information about a UAV position, velocity, or navigation path.

The selection of paths within the decision trees (e.g., decision tree activation) may be based on an analysis of sensor input data using a Bayesian probability operation (e.g., Markov process). The probability operation may include adjusting a probability value using a probability value user input, such as a physical or GUI entry probability adjuster 135. The probability value may be used by a Markov process to generate a predicted state or event (e.g., transit, loiter, or attack) based on current sensor data and based on a state of a previous sensor event.

The Automated Threat Assessment 100 may combine received sensor data and process it according to an ANN using principles of Bayesian probability operations, Markov processes, or other similar processes. In an example, sensor data may be used to determine that a UAV has been sensed 120. A UAV location may be used to determine whether the UAV has entered 130 within a protected area, whether a UAV should be ignored 140, or whether the UAV has not entered a protected area 150. Entry 130 within a protected area may be determined using non-direction RF sensors in various geographic locations, such as sensor locations shown in FIG. 4. The entry 130 within a protected area may be determined based on the UAV being sensed by one or more RF sensors, and may include a determination of how long a UAV has been within range of one or more RF sensors. A decision to ignore 140 may be based on 2-D or 3-D radar data used to determine the UAV is greater than a safety range threshold, such as a range greater than 2 km. A decision to ignore 140 may be based on ADS-B or TIS-B data used to determine the UAV is greater than a safety range threshold, such as a position or altitude greater than 2 km. A no entry 150 decision may be based on sensing a UAV but not having been classified as entry 130 or ignore 140. For all events, the data may be recorded for future analysis, ANN training, or other data analysis. The Automated Threat Assessment 100 may include additional analysis, such as shown in FIG. 2.

Figure 2:
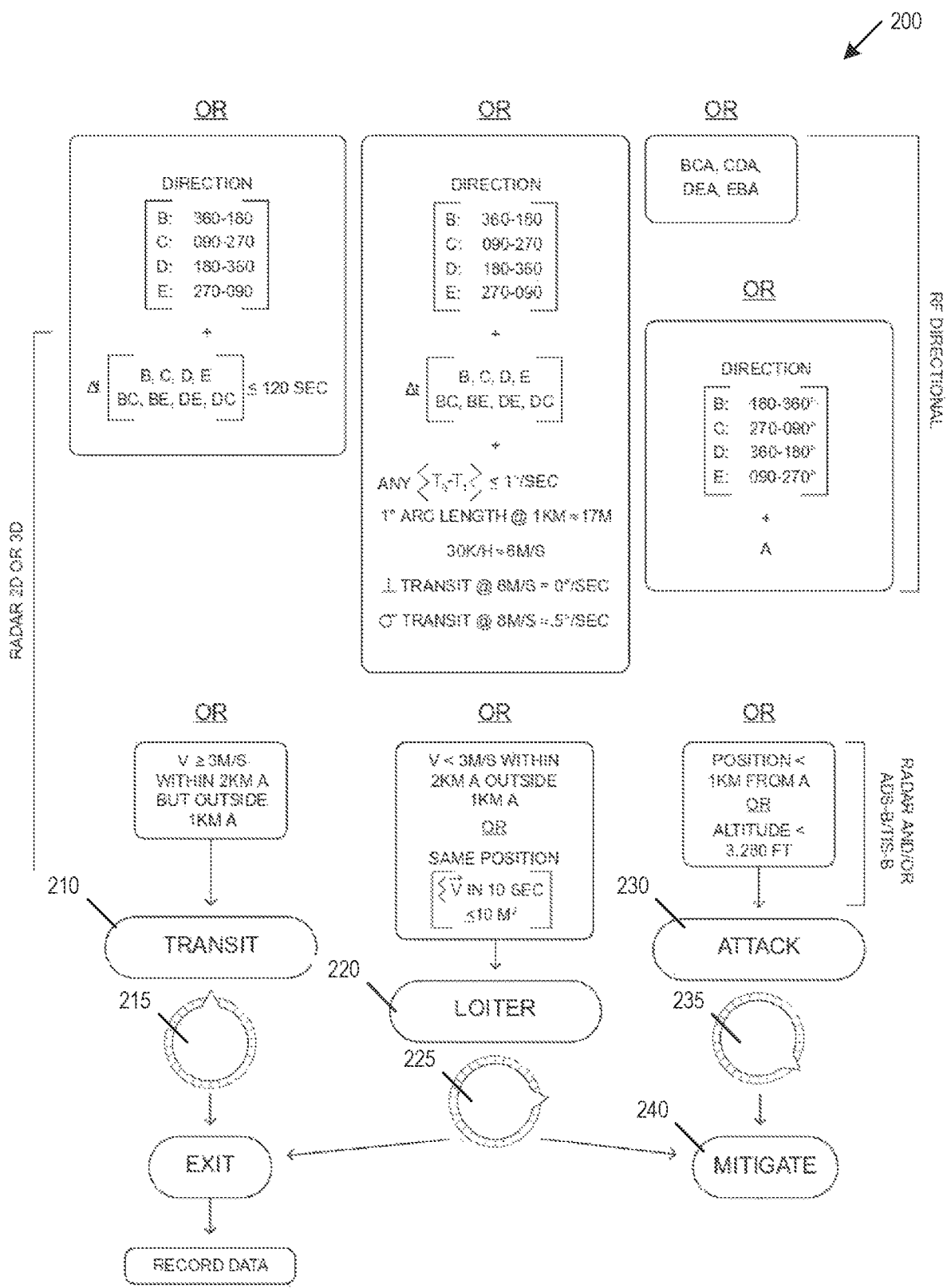
FIG. 2 is a diagram of a UAV Automated Threat Assessment, in accordance with at least one embodiment.

FIG. 2 is a diagram of a UAV Automated Threat Assessment 200, in accordance with at least one embodiment. The Automated Threat Assessment 200 may be applied to a UAV that has been determined to have entered a protected area. When a UAV enters the protected area, the Automated Threat Assessment 200 computes a probability of a sensed intruder UAV as one of three states: a transit state 210, a loiter state 220, or an attack state 230. In an example, the probability of a UAV being in a transit state 210 may be determined by one or more of the following: sensing the UAV using a peripheral sensor but not sensing the UAV using a central sensor, sensing the UAV continuing to move in a linear or curvilinear manner, and sensing the UAV eventually exiting the sensed area. In an example, the probability of a UAV being in a loiter state 220 may be determined by one or more of the following: sensing the UAV using a peripheral sensor but not a central sensor, sensing the UAV does not continue moving in a linear or curvilinear manner, or sensing the UAV remains in a defined area for a period that exceeds a loiter threshold time. In an example, the probability of a UAV being in an attack state 230 may be determined by one or more of the following: sensing the UAV via both a peripheral and a central sensor, or sensing an entry of the UAV into a defined area while exceeding an attack threshold velocity or an attack threshold time.

The Automated Threat Assessment 200 may compute the probability of the sensed intruder UAV in various states based on one or more state probability adjusters, such as a transit state probability adjuster 215, a loiter state probability adjuster 225, or an attack state probability adjuster 235. In an example, the state probability adjusters may be configurable by a user (e.g., operator), and may include physical or GUI adjusters. The state probability adjusters may be used by the ANN to adjust relative weights for the respective probabilities for the transit state 210, the loiter state 220, and the attack state 230, respectively. The output probability state may be provided to a UAS Mitigation and Detection Process, which may determine an automated mitigation.

The automated mitigation may include an automated response (e.g., deployment of UAV countermeasures), prompting a system operator to approve a suggested mitigation response, prompting a system operator to investigate and provide confirmation of a UAV threat, generating an automated mitigation notification, or other automated mitigation action. The automated or suggested UAV response may include a projectile response (e.g., electromagnetic projectile, kinetic projectile), a defensive response (e.g., armor, smoke screen), or other UAV response.

Figure 3:
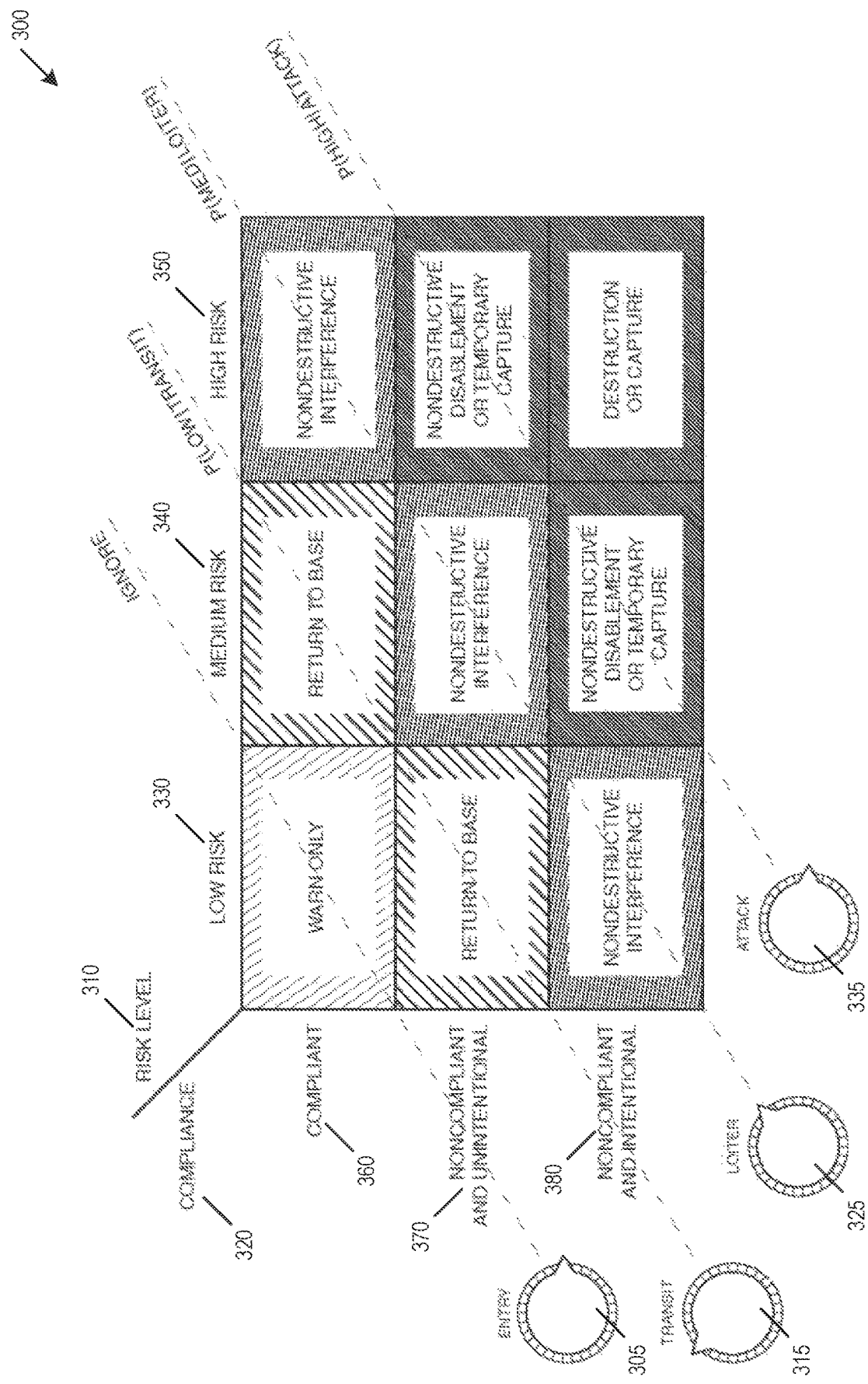
FIG. 3 is a diagram of a UAV mitigation response model, in accordance with at least one embodiment.

FIG. 3 is a diagram of a UAV mitigation response model 300, in accordance with at least one embodiment. Within the mitigation response model 300, a UAV may be assigned a risk level 310 and a compliance classification 320. The risk level 310 may be determined based on UAV risk matrix, and may include a low risk level 330, a medium risk level 340, and a high risk level 350. The UAV mitigation response model 300 may assign a compliance classification 320 to a UAV or to at least portion of a UAV flight based on various UAV characteristics, such as UAV characteristics identified by one or more sensors. The compliance classification 320 may be assigned by an ANN, as described herein. The compliance classification 320 may include a compliant behavior 360, which may be assigned when a UAV is using an approved RF band, is using UAV control messages that follow standard protocols (e.g., commercial RF signature, timestamps), and is complying with requirements under 14 C.F.R. 107, such as complying with UAV registration requirements, maximum altitude, maximum speed, minimum distances from people or structures, and other FAR requirements. A UAV conforming to requirements of compliant behavior 360 may be assigned a primary binary classifier of "0," whereas a noncompliant UAV may be assigned a primary binary classifier of "1." In response to a primary binary classifier of "1," the UAV mitigation response model 300 may continue to test for types of noncompliant behavior to determine the secondary binary classifier.

When a UAV is determined to be noncompliant with requirements under UAVs under 14 C.F.R. 107, the UAV mitigation response model 300 may determine whether the noncompliance is noncompliant and unintentional 370 or noncompliant and intentional 380. A UAV noncompliance behavior may be determined to be unintentional (e.g., ignorant) or intentional (e.g., purposeful) based on various factors, such as complying with property boundaries, UAV registration requirements, maximum altitude, maximum speed, minimum distances from people, structures, visible boundaries, or other factors. In an embodiment, trespassing over a perimeter of interest may be weighted more heavily than other factors in determining the compliance classification 320. For example, trespassing over obvious and marked boundaries, such as an airport perimeter fence or a prison wall, may be classified as noncompliant and intentional 380.

A set of nearby property types may provide mitigating factors in determining UAV compliance, such as flight paths consistent with particular UAV uses. For example, a farm adjacent to a prison may fly a UAV in long, serpentine flight paths to apply fertilizer or capture precision agriculture images, and a UAV adjacent to a prison boundary may be classified as compliant 360 based on flight paths consistent with agricultural UAVs. In another example, a UAV adjacent to a prison boundary may be classified as noncompliant and intentional 380 based on flight paths consistent with prison surveillance, such as following a prison perimeter or hovering in place.

Similarly, a UAV whose flight path consistently respects a property boundary but temporarily trespasses over that property boundary may be classified as a momentary noncompliance incident. For example, a UAV may be blown over a property line by a wind gust and immediately return to a previous location before the temporary trespass. In an example, a compliant behavior 360 classification may be converted to noncompliant and unintentional 370 or noncompliant and intentional 380 after exceeding a threshold number of momentary noncompliance incidents, such as three momentary noncompliance incidents by a registered and identified UAV within a day or other predetermined time interval.

A noncompliant and unintentional behavior 370 may also be assigned when a UAV is not complying with requirements under 14 C.F.R. 107, but is using an approved RF band and is using UAV control messages that follow standard UAV protocols. A noncompliant and intentional behavior 380 may be assigned when a UAV is not complying with any of these criteria, such as requirements under 14 C.F.R. 107, using an approved RF band, or using UAV control messages that follow standard protocols. Examples of not using an approved RF band or using control messages that follow standard protocols may include an RF signal that does not match known UAV controller signal characteristics (e.g., is not matched within a database of known UAV controller signal characteristics), or a UAV that appears to be flying without sending or receiving RF control signals (e.g., fully autonomous flight). A noncompliant and intentional behavior 380 may be associated with a homemade UAV configuration (e.g., a "homebrew") or with criminal activity.

Because UAV characteristics and flight activity may change over time, the UAV mitigation response model 300 may associate a compliance classification 320 with a portion of a UAV flight, such as a time interval or a portion of a flight pattern. For example, a properly registered and marked UAV may conform to all compliant behavior 360 for most of a flight, but the same registered UAV may subsequently fly through a restricted airspace or other prohibited area. A UAV conforming to requirements of noncompliant and intentional 370 may be assigned a secondary binary classifier of "0,"

whereas a noncompliant and unintentional 380 may be assigned a secondary binary classifier of "1."

This classification system, including the use of the ANN as described below, enables the UAV detection and mitigation system to learn site-specific events and exceptions. In an example, the threshold number of momentary noncompliance incidents may be modified dynamically by the UAV detection and mitigation system based on the learned site-specific events and exceptions.

Once a UAV has been assigned a risk level 310 and a compliance classification 320, the mitigation response model 300 may identify one or more mitigation responses, which may be modified by one or more state probability adjusters, such as shown in FIG. 3. A mitigation response may include warning an operator, such as when a UAV is identified to be low risk 330 and compliant 360. The probability of a mitigation response including warning the operator may be based on an entry state probability adjuster 305. A mitigation response may include commanding the UAV to return to base, such as when a UAV is identified to be (a) low risk 330 and noncompliant and unintentional 370 or (b) medium risk 340 and compliant 360. Many UASs (e.g., UAV and vehicle controller) have a control loss-link functionality that causes the UAV to return to a predetermined base location, and the mitigation response may include causing sufficient interference with the control loss-link functionality to cause the UAV to return to the base location. The probability of a mitigation response including commanding the UAV to return to base may be based on a transit state probability adjuster 315. A mitigation response may include nondestructive interference of the UAV, such as when a UAV is identified to be (a) low risk 330 and noncompliant and intentional 380, (b) medium risk 340 and noncompliant and unintentional 370, or (c) high risk 350 and compliant 360. The nondestructive interference may include causing an interfering command signal to be sent to the UAV, where the interfering command signal may cause the UAV to hover in place or to land in place. The probability of a mitigation response including nondestructive interference of the UAV may be based on a loiter state probability adjuster 325. A mitigation response may include nondestructive disablement or temporary capture of the UAV, such as when a UAV is identified to be (a) medium risk 340 and noncompliant and intentional 380 or (b) high risk 350 and noncompliant and unintentional 370. The nondestructive disablement or temporary capture may include ensnaring the UAV in a net, causing a nondestructive substance (e.g., conductive fluid, expanding foam) to be applied to an exterior or interior of the UAV, or causing non-damaging electronic interference (e.g., jamming). In an example, the non-damaging electronic interference causes the UAV to land immediately but not to disconnect from the UAV controller. A mitigation response may include destructive disablement or permanent capture of the UAV, such as when a UAV is identified to be (a) high risk 350 and noncompliant and intentional 380. The destructive disablement or permanent capture may include causing a projectile to destroy at least a portion of the UAV, or causing a damaging electronic interference at a power level sufficient to cause permanent damage to UAV electronic components. The probability of a mitigation response including disablement or capture of the UAV may be based on an attack state probability adjuster 335. Each of these responses may be automated or may require an operator confirmation. For example, destructive disablement may require an operator confirmation before deploying, whereas nondestructive and all other mitigation responses may be deployed automatically without requiring operator confirmation.

As shown in FIG. 3, the state probability adjusters are overlaid on the matrix to represent approximate values and the range of adjustment of those values the adjusters would have on the suggested mitigation resolutions. For example, if a majority of intruding UAVs were sensed and classified as loitering, but were actually transiting relatively slowly, the output of the matrix may suggest nondestructive interference. The operator, based on experience, may elect to decrease the sensitivity to loitering behavior by turning down the loiter knob, or may elect to increase the sensitivity to transit behavior by turning up the transit knob. The output range of mitigation suggestions would then shift, which may increase the likelihood of the mitigation response including warn only or including return to base. While the probability values may be adjusted by adjusting the state probability adjusters, the sensor threshold values for determining the specific behavior may not change. The mitigation output suggested by the ANN algorithm may then be tuned to provide a solution that more closely matches the operators desired response for a specific combination of UAV risk level 310 and compliance 320.

Figure 4:
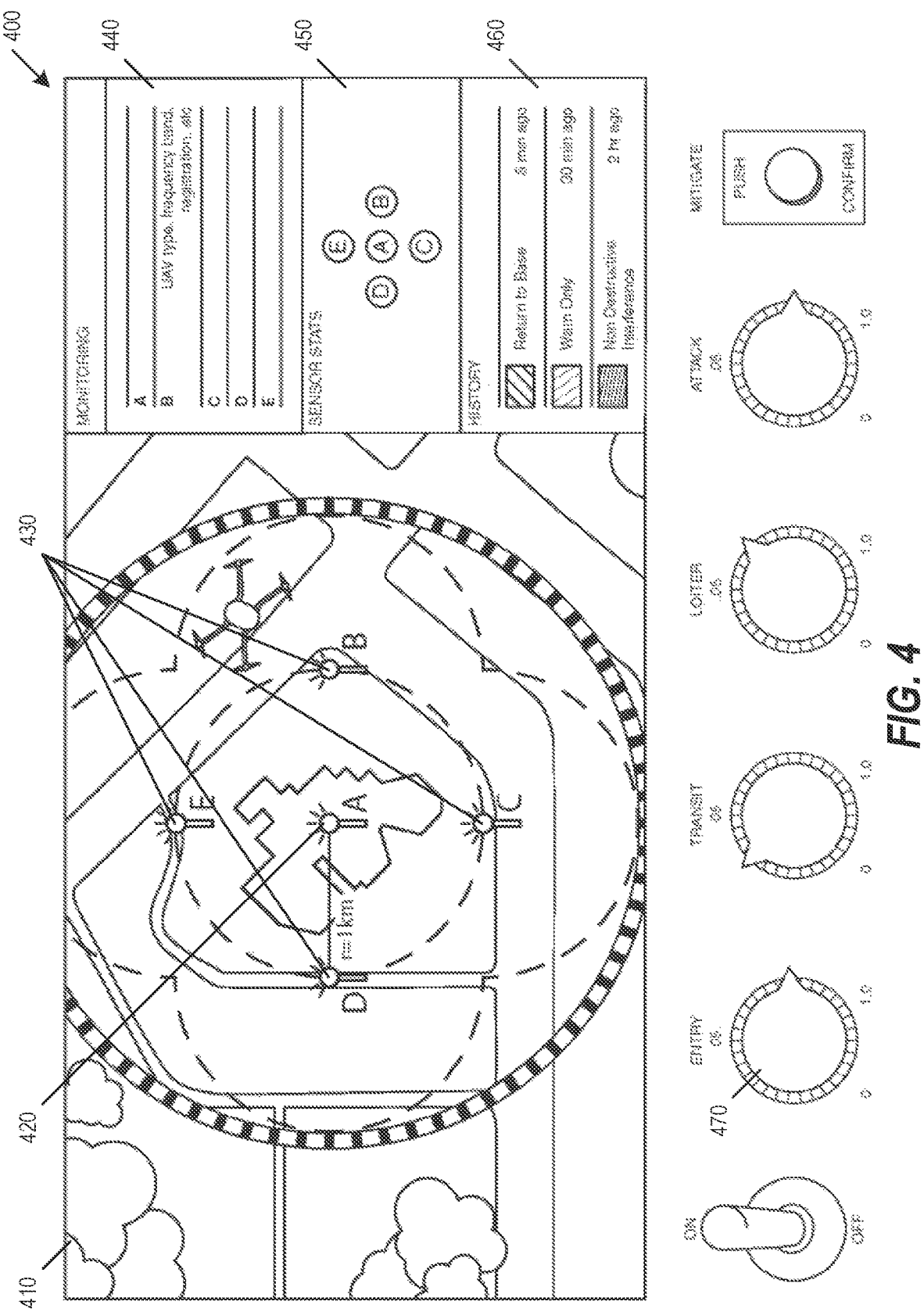
FIG. 4 is a diagram of an Automated Threat Assessment GUI, in accordance with at least one embodiment.

FIG. 4 is a diagram of an Automated Threat Assessment GUI 400, in accordance with at least one embodiment. The Automated Threat Assessment GUI 400 may include various graphical elements to increase situational awareness for the operator of the system. A large plan view 410 may show the location of a sensor array. The sensor array may include central sensor A 420, which may be collocated with a building, area, or object to be protected. Sensory array 400 may include peripheral sensors 430, such as sensors B, C, D, and E. The peripheral sensors 430 may include non-directional RF sensors or directional RF sensors. Each sensor may include a nondirectional RF sensor or a directional RF sensor, and may include a radar unit or ADS-B/TIS-B receiver. The central sensor A 420 and peripheral sensors 430 may be arranged to provide a desired coverage, such as shown in FIG. 5.

The Automated Threat Assessment GUI 400 may include a monitoring panel 440 may display information about one or more sensed UAVs. A sensor stats panel 450 may show various sensor statistics, such as operational state or uptime. A history window panel 460 may show information about recently sensed UAVs, and may indicate a UAV disposition and a time since the UAV was sighted.

The Automated Threat Assessment GUI 400 may include one or more virtual radio knobs 470, which may be used as probability state adjusters. Each probability state adjuster may correspond to a probability value within the ANN algorithm, and may be used to assign a relative sensitivity weight to each probability state for determining a UAV state. When a probability state adjuster is changed, the ANN algorithm sensitivity to a particular state may be increased or decreased, depending on the direction of change. For example, an operator increasing the value of the loiter knob would result in an increase in the ANN algorithm probability value in the Markov chain from entry to loiter and transit to loiter. This may apply a weighting to the algorithm outcome to increase the probability of suggesting a UAV mitigation response appropriate to loitering. The ANN algorithm may then learn from the new weights and align its automated mitigation suggestions with newly adjusted values. While the probability values used in the ANN algorithm vary from 0 to 1, the probability state adjusters may be implemented such that the probability on each of the virtual radio knobs 470 does not correspond linearly to the probability values used in the ANN algorithm, as a large change in probability may distort the ANN algorithm. For example, if an operator modified an entry probability to be 1.0, then the ANN algorithm may always identify an entry state regardless of actual UAV operation. Instead of mapping the values on the virtual radio knobs 470 linearly to the probability values used in the ANN algorithm, the values on the virtual radio knobs 470 may be mapped to a minimum and maximum useful range. For example, an operator modifying an entry probability from 0 to 1 may modify an entry probability value from 0.4 to 0.6.

Figure 5:
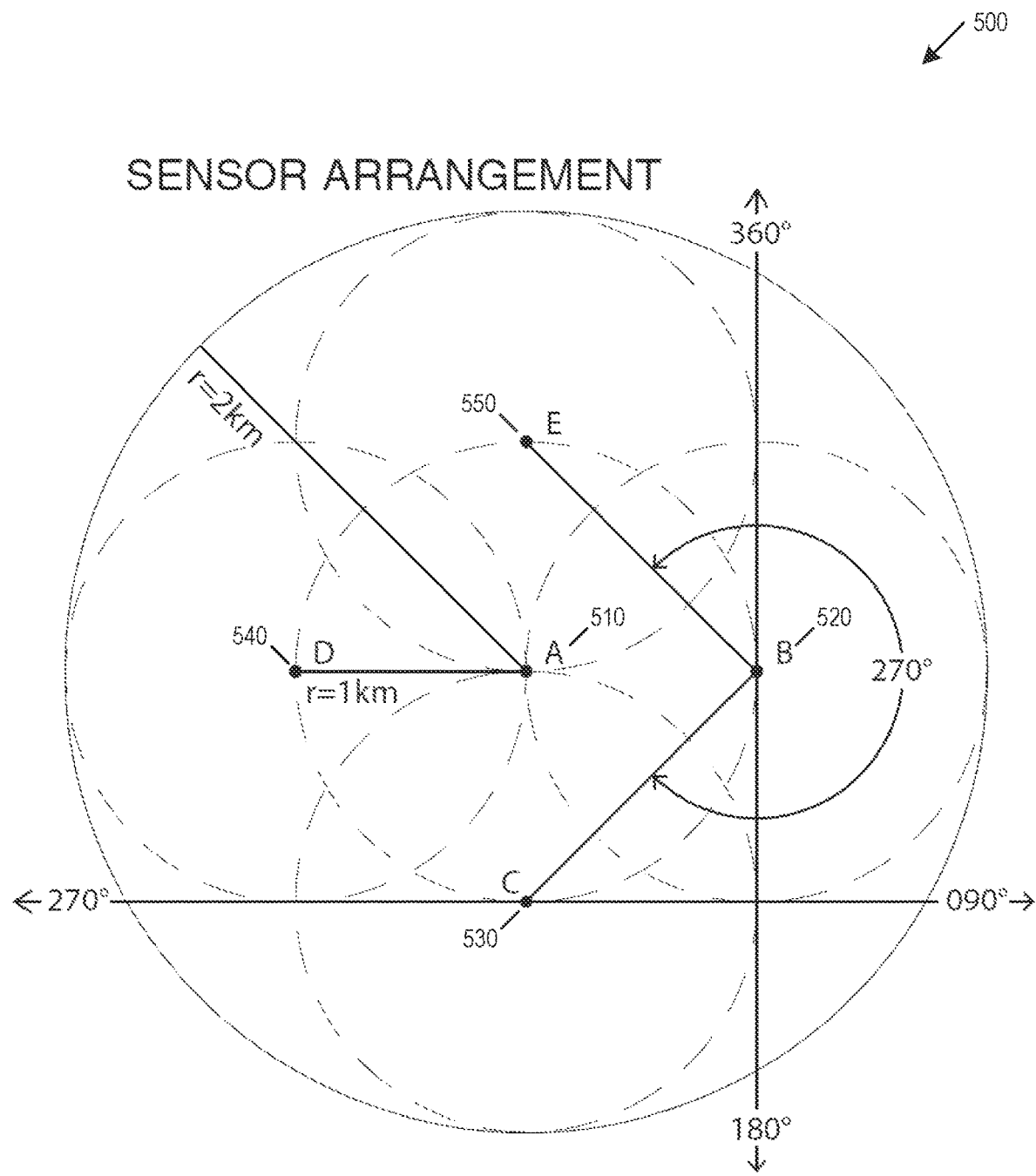
FIG. 5 is a diagram of a sensor arrangement, in accordance with at least one embodiment.

FIG. 5 is a diagram of a sensor arrangement 500, in accordance with at least one embodiment. The peripheral sensors 430 shown in FIG. 4 may include four peripheral sensors 520, 530, 540, and 550 arranged around central sensor 510. The peripheral sensors 520, 530, 540, and 550 may be arranged in a configuration that maximizes coverage while providing sufficient overlap. In an example, each of the peripheral sensors 520, 530, 540, and 550 may be arranged to overlap two adjacent peripheral sensors 520, 530, 540, and 550 while maximizing overall coverage, such as four approximately equally spaced sensors surrounding central sensor 510. While four peripheral sensors 520, 530, 540, and 550 are shown, a different number of sensors may be used to provide additional range information or to provide additional coverage for difficult ranging environments (e.g., urban canyon, thick foliage).

Central sensor 510 may be selected or configured to provide a greater effective receiver range than peripheral sensors 520, 530, 540, and 550, and may overlap the range of all peripheral sensors 520, 530, 540, and 550. In an example, the range of central sensor 510 may include a 2 km radius, and the range of each of the peripheral sensors 520, 530, 540, and 550 may include a 1 km radius or greater to provide overlap among sensors. In an example, the overall protected area may include a substantially circular area with a radius of approximately 2 km or greater. The actual shape of the protected area may be noncircular, and may depend on the local geography of the installation. As shown in FIG. 5, the peripheral sensors 520, 530, 540, and 550 may be arranged to correlate with cardinal compass directions of West (e.g., 270°), South (e.g., 180°), East (e.g., 90°), and North (e.g., 360°, 0°), respectively. Aligning sensors with cardinal directions may aid in an intuitive understanding of a UAV location, such as detecting a UAV north of central sensor 510 within the range of peripheral sensor E 550. The peripheral sensors 520, 530, 540, and 550 may be arranged in other compass directions, and the sensor locations and compass directions relative to central sensor 510 may be used in UAV detection and mitigation determination, such as proximity-based detection shown in FIG. 6.

Figure 6:
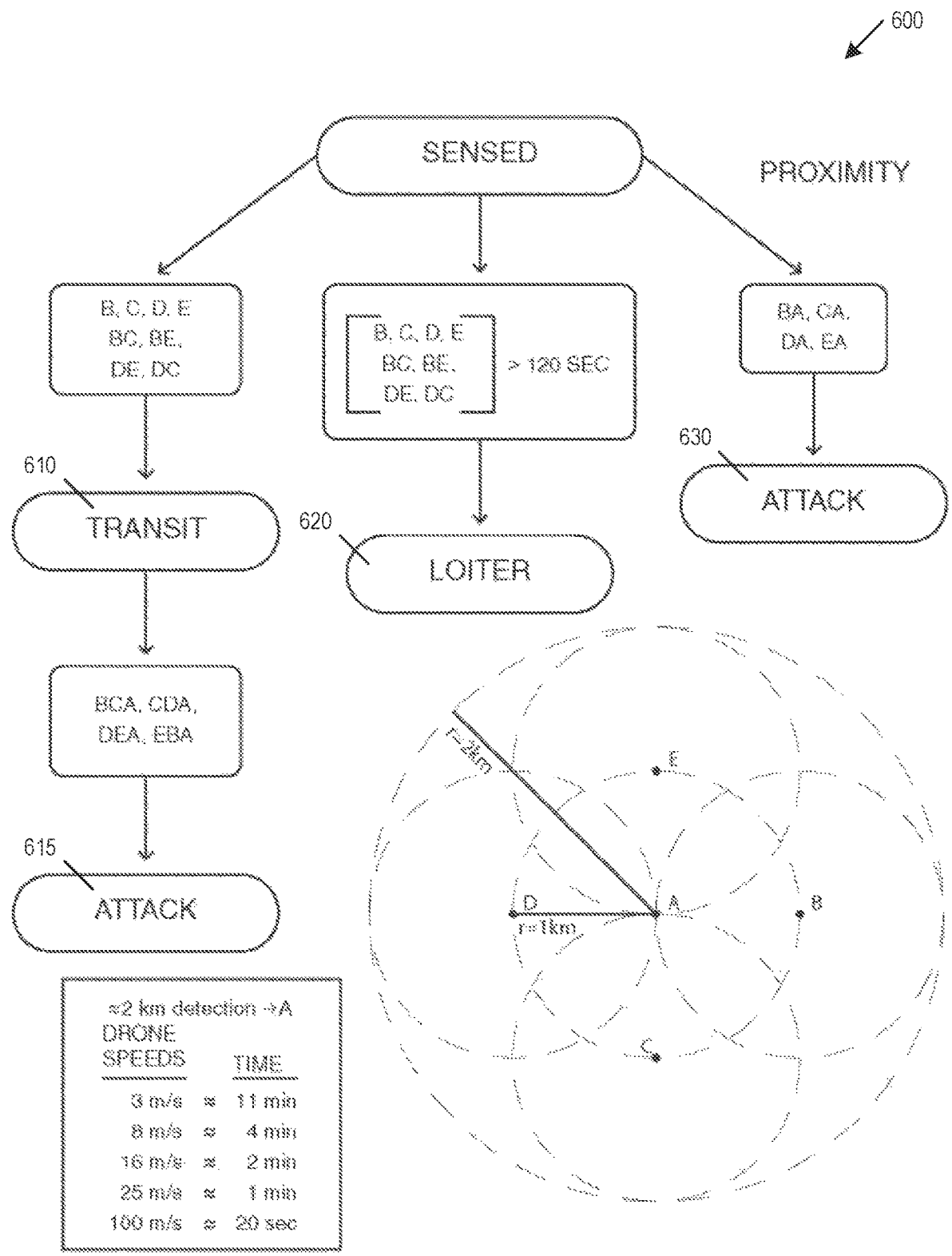
FIG. 6 is a diagram of a proximity-based Bayesian probability operation, in accordance with at least one embodiment.

FIG. 6 is a diagram of a proximity-based Bayesian probability operation 600, in accordance with at least one embodiment. The probability operation 600 may be based on a sensor system using non-directional, proximity-based RF identification. This proximity-based Bayesian probability operation 600 may be used when some or all available sensors are non-directional. The probability state may be determined in a binary manner and combined with a time threshold. Entry into a protected area may be sensed by one or more periphery sensors. For example, a combination of periphery sensors may sense the intruding UAV, such as a combination of sensor activation states BC, BE, DE, or DC. A time threshold may be initialized using a table of drone speeds across a distance of 2 km, such as shown in Table 1 below:

TABLE 1

| Drone Speed Transit Time | |
|---|---|
| Drone Speed (m/s) | Time to Transit 2 km |
| 3 | 11 min |
| 8 | 4 min |
| 16 | 2 min |
| 25 | 1 min |
| 100 | 20 sec |

In an example, the probability operation 600 may indicate a transit state 610 in response to an initial sensor activation state of B, C, D, E, BC, BE, DE, or DC. The initial indication of a transit state 610 may change to a transit attack state 615, such as when the initial sensor activation state changes to a sensor activation state of three or more sensors activated simultaneously. A loiter state 620 may be identified when the initial sensor activation state exceeds a loiter time threshold, such as 120 seconds. An attack state 630 may be identified when the central sensor senses the UAV in conjunction with a peripheral sensor, such as sensor activation states BA, CA, DA, or EA. In an example, the probability operation 600 may prevent changing to a transit state 610 or a loiter state 620 until an attack time interval has elapsed. For example, once the attack state 630 is indicated, if at an attack time interval of at least 120 seconds from initial entry while central sensor A is no longer activated, the probability operation 600 may transition from an attack state 630 to a loiter state 620. When more than one UAV is sensed, a separate UAV timer may be used for each UAV. For sensor systems that are unable to differentiate between different UAVs, any UAV timer exceeding an attack time interval may be used to indicate a loiter state 620 for all UAVs within the range of the sensors. For sensor systems that are able to differentiate between different UAVs, each UAV timer may be compared against the attack time interval to indicate a loiter state 620 for that UAV.

Figure 7:
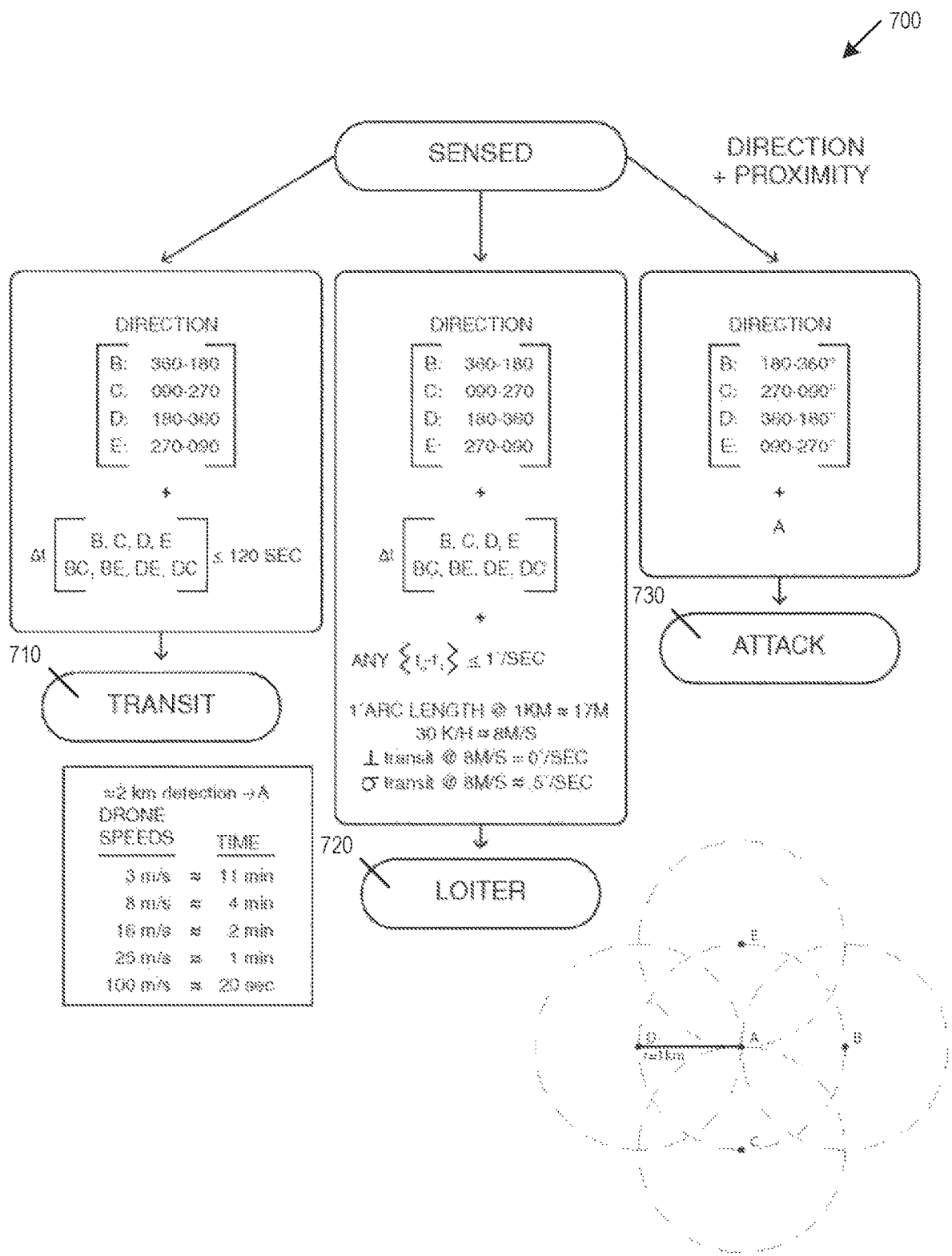
FIG. 7 is a diagram of a direction and proximity Bayesian probability operation, in accordance with at least one embodiment.

FIG. 7 is a diagram of a direction and proximity Bayesian probability operation 700, in accordance with at least one embodiment. Probability operation 700 may be used with a sensor system that includes RF identification that includes direction finding ability in the central sensor A and peripheral sensors B, C, D, and E. These directional sensors may be able to identify a direction (e.g., directional vector) of a UAV with respect to each sensor. In an example, one or more of the directional sensors may be able to detect a distance to a UAV, and use the direction and distance to estimate a UAV location. In another example, one or more of the directional sensors may not be able to detect a distance to a UAV, and may rely on intersections of two or more UAV directions provided by two or more directional sensors to estimate a UAV location.

Using directional RF sensors, the probability state may be determined based on a combination of UAV direction (e.g., geometrically derived location) combined with a time threshold. In an example, entry into the protected area may be sensed by one of the proximity sensors B, C, D, or E. A combination of peripheral sensors may also sense an intruding UAV, in the manner of BC, BE, DE, or DC. A combination of directional sensors may be used to provide two or more UAV directional vectors, and the intersections of two or more directional vectors may be used to estimate a UAV location.

In an example, a transit state 710 may be determined based on a UAV that enters and leaves the detection area. In particular, the transit state may be identified based on a combination of two conditions: first, a peripheral directional transition of B sensing 360°-180°, C sensing 090°-270°, D sensing 180°-360°, or E sensing 270°-090°; and second, a UAV transit duration below a transit duration threshold of 120 seconds B, C, D, E, BC, BE, DE, or DC. The compass headings used in defining sectors B, C, D, and E may be any headings between 0 and 360, depending on the installation, and may be arranged such that the peripheral sensors are sectored sequentially around central sensor A.

A transit state 710 may be changed to a loiter state 720 or an attack state 730 based on various criteria. In an example, a loiter state 720 may be determined based on a combination of three conditions: first, a peripheral directional transition of B sensing 360°-180°, C sensing 090°-270°, D sensing 180°-360°, or E sensing 270°-090°; second, a UAV transit duration above a transit duration threshold of 120 seconds B, C, D, E, BC, BE, DE, or DC; and third, an angular velocity of less than or equal to a maximum angular velocity threshold. In an example, the maximum angular velocity threshold may be determined to be 1 per second (e.g., deg/sec). A UAV traveling 1 of arc length at 1 km may travel approximately 17 m. A UAV moving at 8 meters per second may travel for approximately 120 seconds to travel 1 km. If a single peripheral directional sensor sensed a UAV moving in a line of position directly towards or away from the sensor, the arc speed would be 0 deg/sec. If a single peripheral directional sensor sensed a UAV moving tangentially at 8 m/s, its arc speed would be 0.5 deg/sec. In 120 seconds at a minimum arc speed of 0 deg/sec (e.g. moving directly towards or away from the sensor), the UAV would either have transited out of range and exited the protected area or traveled within range of another sensor. In 120 seconds at an arc speed of 0.5 deg/sec, the UAV would either have transited out of range and exited the protected area or traveled within range of another sensor. In either case, and at higher speeds, the limitations from obtaining a single line of position are minimized by including an arc speed calculation using the above assumptions to determine the loiter state 720.

Directional RF sensors are capable of identifying more than one UAV located on different lines of position. If multiple UAVs are approaching from a single direction relative to a directional RF sensor, then the RF directional sensor may not be able to detect more than one of the multiple UAVs. By using multiple directional RF sensors in different locations, multiple UAVs may be detected by adjacent sensors providing multiple directional vectors. A loiter state 720 may be changed to a transit state 710. For example, a loiter state 720 may transition to a transit state 710 when another peripheral sensor is activated before the transit duration threshold is met.

An attack state 730 may be triggered when any peripheral sensor and sensor A are activated, indicating the UAV is in close proximity to the central building or object to be protected. Once the state changes to an attack state 730, even if the UAV leaves the sensor A area, the probability operation 700 may not revert back to the transit state 720 or the loiter state 720. In an example, the probability operation 700 may remain in an attack state 730 until there is an external intervention, such as a deployment of a UAV mitigation measure or a state change executed by an operator.

Figure 8:
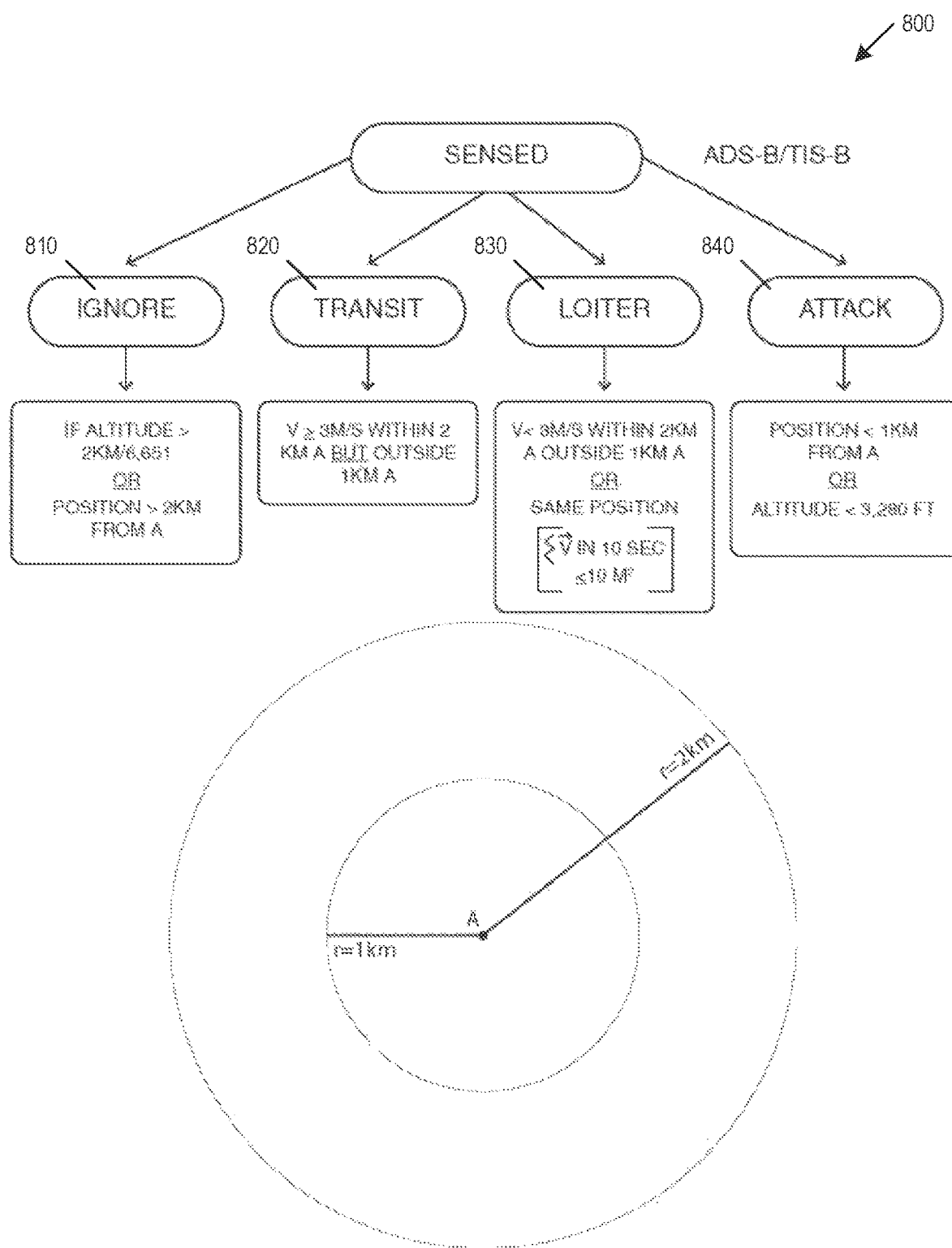
FIG. 8 is a diagram of an ADS-B and TIS-B Bayesian probability operation, in accordance with at least one embodiment.

FIG. 8 is a diagram of an ADS-B and TIS-B Bayesian probability operation 800, in accordance with at least one embodiment. Probability operation 800 may incorporate ADS-B and TIS-B reported data into the UAV Automated Threat Assessment, such as to augment the capabilities of RF sensors. ADS-B and TIS-B reported data may be provided by participating aircraft and UAVs. This data may be added as a filter layer to provide input data used to sort potential threats from other airborne traffic.

Probability operation 800 may use the geographic location of sensor A to reference the ADS-B and TIS-B reported data and determine probabilistic states. When the system is on and receiving ADS-B and TIS-B reported data, probability operation 800 may identify an ignore state 810 when the reported data indicates the UAV altitude is greater than 2 km (e.g., 6,651 feet) or the UAV position is greater than 2 km from central sensor A. A transit state 820 may be identified when the reported data indicate that the UAV is within 2 km of sensor A, the UAV is greater than 1 km from A, and the UAV velocity is greater than or equal to 3 m/s. The transit state 820 may change to a loiter state 830 when the reported data indicates that the UAV within 2 km of sensor A, the UAV is greater than 1 km from sensor A, and the UAV velocity is less than 3 m/s. The transit state 820 may also change to a loiter state 830 when the reported data indicates that the UAV remains in the same relative position, where the sum of velocity vectors in 10 seconds is less than or equal to 10 square meters. An attack state 840 may be identified when the reported data indicates that the UAV reported horizontal position is less than 1 km from sensor A or the UAV altitude is less than 1 km (e.g., 3,280 feet) over sensor A. Once the state changes to an attack state 840, even if the UAV no longer meets the location criteria for attack state 840, the probability operation 800 may not revert back to the transit state 820 or the loiter state 820. In an example, the probability operation 800 may remain in an attack state 840 until there is an external intervention, such as a deployment of a UAV mitigation measure or a state change executed by an operator.

Figure 9:
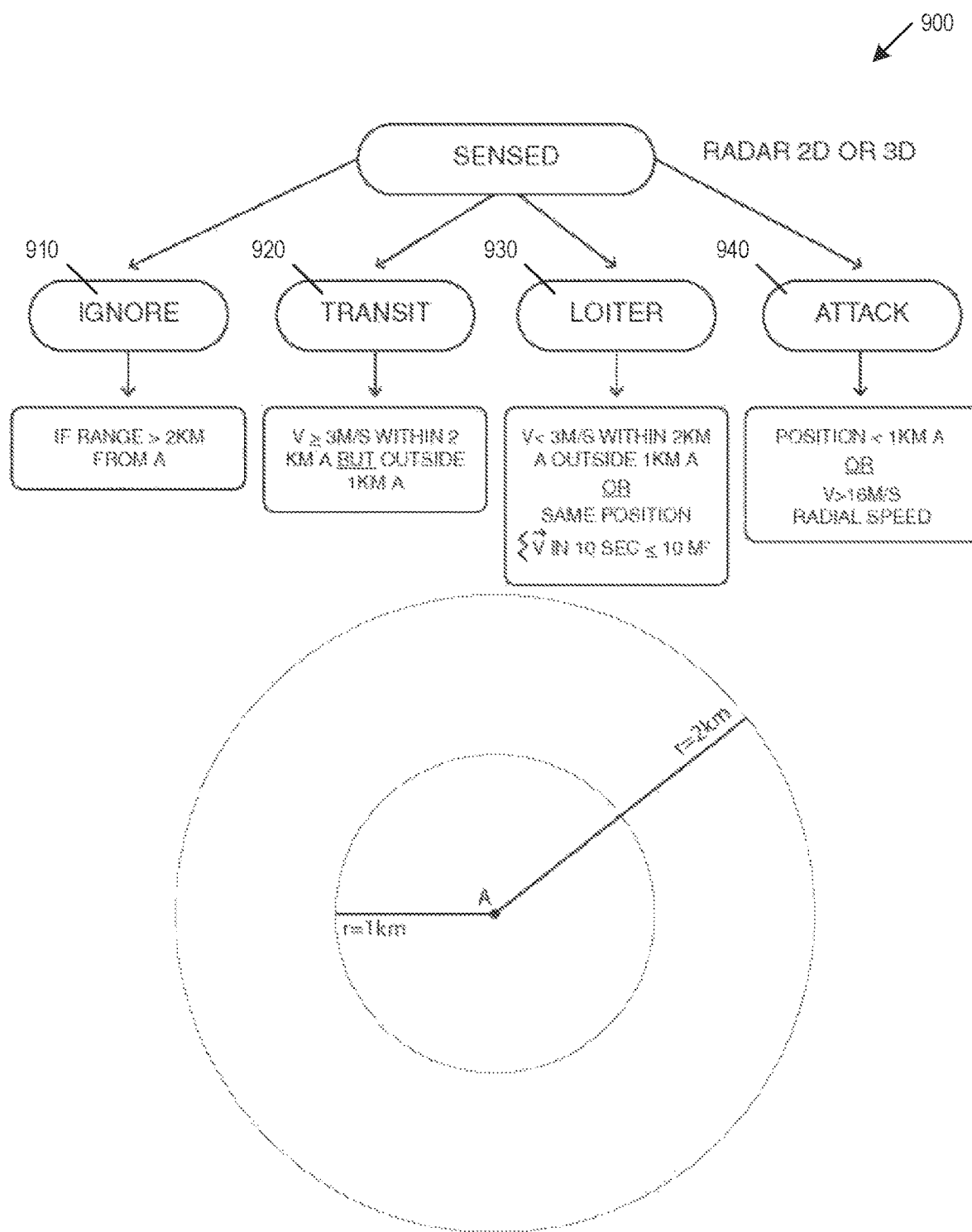
FIG. 9 is a diagram of radar Bayesian probability operation, in accordance with at least one embodiment.

FIG. 9 is a diagram of radar Bayesian probability operation 900, in accordance with at least one embodiment. Probability operation 900 may use a 2-D or 3-D radar system at location A to detect a direction and range of one or more UAVs. In an example, a radar system may be selected and tuned to detect UAVs at a range of at least a 2 km. The radar output data may be combined with other sensor data in the UAV Automated Threat Assessment to provide additional sensing capabilities.

Probability operation 900 may identify an ignore state 910 when radar data identifies a UAV with a range of greater than 2 km. A transit state 920 may be identified when radar data indicates a UAV is within 2 km of location A, the UAV is greater than 1 km from location A, and the UAV velocity is at least 3 m/s. A loiter state 930 may be identified when the radar data indicates the UAV velocity is less than 3 m/s and the UAV is within 2 km of location A. A loiter state 930 may also be identified when the radar data indicates the UAV remained in the same relative position, where the sum of velocity vectors in 10 seconds is less than or equal to 10 square meters. An attack state 940 may be identified when the radar data indicates the UAVs sensed position is less than 1 km from location A. An attack state 940 may also be identified when the radar data indicates the UAV is within 2 km of location A and the UAV velocity toward location A is at least 16 m/s.

Figure 10:
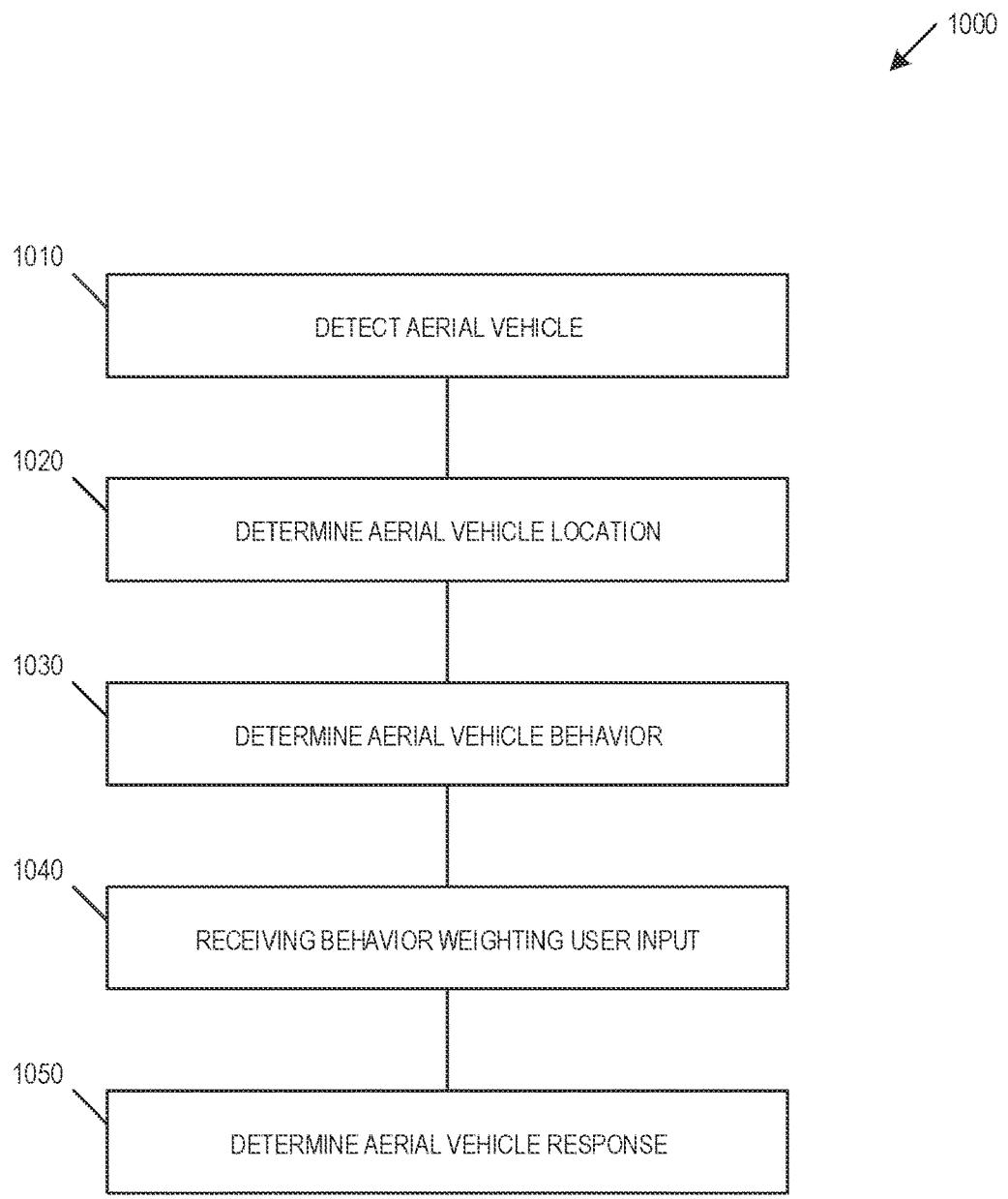
FIG. 10 is a UAV detection and mitigation method, according to an example embodiment.

FIG. 10 is a UAV detection and mitigation method 1000, according to an example embodiment. Method 1000 may include detecting 1010 an aerial vehicle at an aerial vehicle detection sensor. Method 1000 may include determining 1020 an aerial vehicle location at the aerial vehicle detection sensor. Method 1000 may include determining 1030 an aerial vehicle behavior based on the aerial vehicle location. Method 1040 may include receiving 1040 a behavior weighting user input from a behavior weighting input device. The determination of the aerial vehicle behavior may be based further on the behavior weighting user input. Method 1000 may include determining 1050 an aerial vehicle response based on the aerial vehicle behavior. The aerial vehicle detection sensor may include at least one of a plurality of non-directional detection zone sensors, a radar sensor, and an aerial vehicle location broadcast sensor. The determination of the aerial vehicle behavior may include determining the aerial vehicle is in a transit mode, a loiter mode, or an attack mode.

The determination of the aerial vehicle behavior may include an aerial vehicle behavior engine stored in the one or more storage devices, the aerial vehicle behavior engine previously trained with a labeled input data set for supervised learning, the labeled input data set including a plurality of previously classified aerial vehicle detection sensor data. The determination of the compliance classification based on the detection data set may include training the aerial vehicle behavior engine with an unlabeled input data set for unsupervised learning, the unlabeled input data set including an aerial vehicle location data set previously generated by the aerial vehicle detection sensor.

The plurality of non-directional detection zone sensors may include a first zone sensor and a second zone sensor, and the determination of the aerial vehicle behavior may be based further on a first data set received from the first zone sensor with a second data set received from the second zone sensor. The aerial vehicle detection sensor may include the radar sensor, and the aerial vehicle location may include at least one of a radar vehicle range and a radar vehicle altitude. The aerial vehicle detection sensor may include the aerial vehicle location broadcast sensor, and the aerial vehicle location may include at least one of a broadcast vehicle range and a broadcast vehicle altitude. The aerial vehicle location broadcast sensor may include at least one of an automatic dependent surveillance-broadcast (ADS-B) sensor and a traffic information service-broadcast (TIS-B) sensor.

Figure 11:
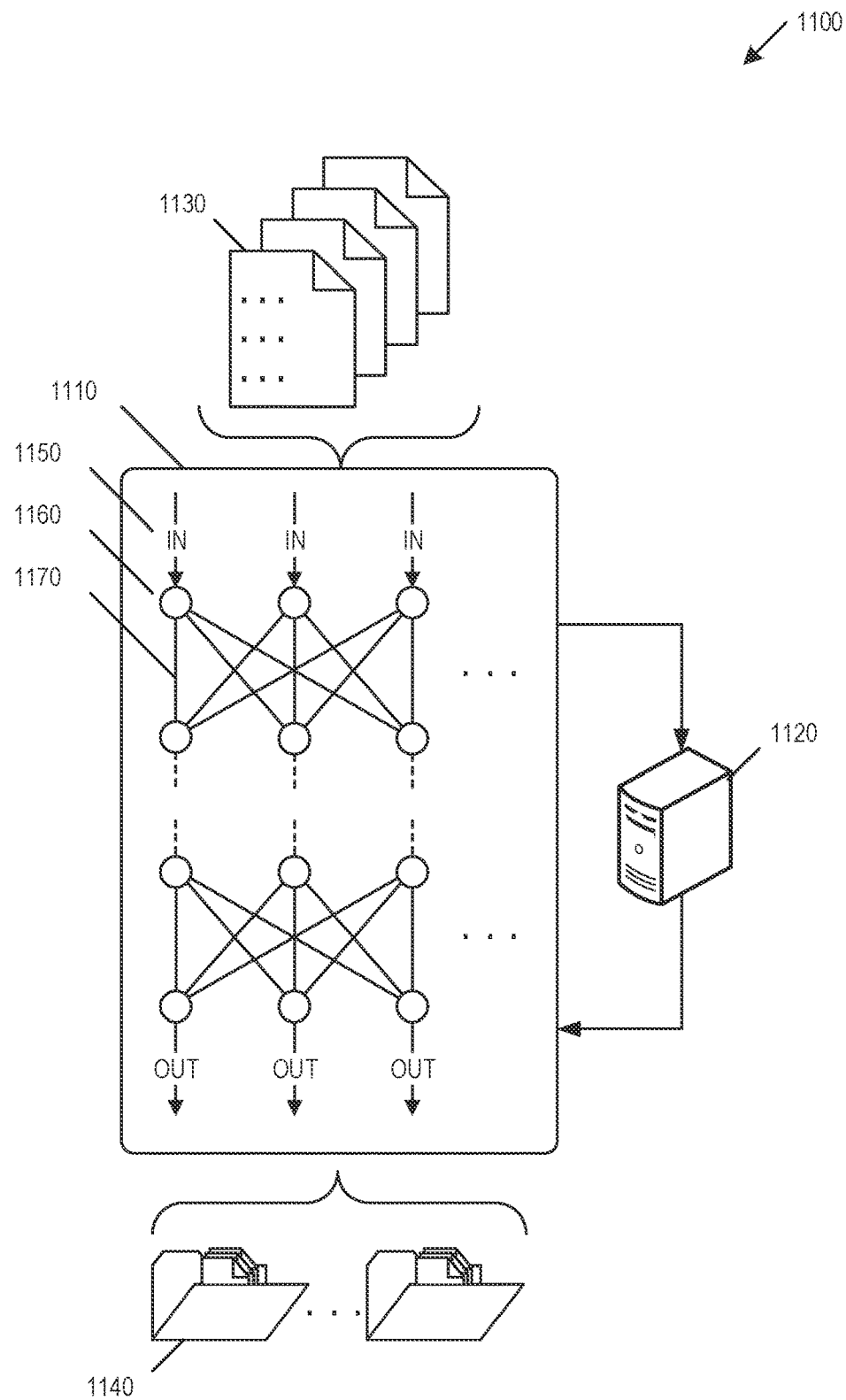
FIG. 11 is a block diagram of an example neural network training system for UAV detection and mitigation, according to an embodiment.

FIG. 11 is a block diagram of an example neural network training system 1100 for UAV detection and mitigation, according to an embodiment. The UAV detection and mitigation system 1100 includes an ANN 1110 that is trained using a processing node 1120. The processing node 1120 may be a CPU, GPU, field programmable gate array (FPGA), digital signal processor (DSP), application specific integrated circuit (ASIC), or other processing circuitry. In an example, multiple processing nodes may be employed to train different layers of the ANN 1110, or even different nodes 1160 within layers. Thus, a set of processing nodes 1120 is arranged to perform the training of the ANN 1110.

The set of processing nodes 1120 is arranged to receive a training set 1130 for the ANN 1110. The training set 1130 may include previously stored data from one or more UAV detection sensors. The ANN 1110 comprises a set of nodes 1160 arranged in layers (illustrated as rows of nodes 1160) and a set of inter-node weights 1170 (e.g., parameters) between nodes in the set of nodes. In various embodiments, an ANN 1110 may use as few as two layers of nodes, or the ANN 1110 may use as many as ten or more layers of nodes. The number of nodes 1160 or number of node layers may be selected based on the type and complexity of the UAV detection and mitigation system. In various examples, the ANN 1110 includes a node layer corresponding to multiple sensor types, a node layer corresponding to multiple perimeters of interest, and a node layer corresponding to compliance with requirements under 14 C.F.R. 107. In an example, the training set 1130 is a subset of a complete training set of data from one or more UAV detection sensors. Here, the subset may enable processing nodes with limited storage resources to participate in training the ANN 1110.

The training data may include multiple numerical values representative of a UAV compliance classification 1140, such as compliant, noncompliant unintentional, and noncompliant intentional. During training, each value of the training is provided to a corresponding node 1160 in the first layer or input layer of ANN 1110. Once ANN 1110 is trained, each value of the input 1150 to be classified is similarly provided to a corresponding node 1160 in the first layer or input layer of ANN 1110. The values propagate through the layers and are changed by the objective function.

As noted above, the set of processing nodes is arranged to train the neural network to create a trained neural network. Once trained, the input UAV detection data 1150 will be assigned into categories such that data input into the ANN 1110 will produce valid UAV compliance classifications 1140. Training may include supervised learning, where portions of the training data set are labeled using UAV compliance classifications 1140. After an initial supervised learning is completed, the ANN 1110 may undergo unsupervised learning, where the training data set is not labeled using UAV compliance classifications 1140. For example, the ANN 1110 may be trained initially by supervised learning using previously classified UAV detection data, and subsequently trained by unsupervised learning using newly collected UAV detection data. This unsupervised learning using newly collected UAV detection data enables the system to adapt to a specific UAV detection and mitigation site, including the site geography, perimeters of interest, number and types of UAV sensors, and other site-specific information. This unsupervised learning also enables the system to adapt to changes in the UAV detection and mitigation site, such as modifications to perimeters of interest, adding additional UAV sensors, and other site-specific changes.

The training performed by the set of processing nodes 1160 is iterative. In an example, each iteration of the training the neural network is performed independently between layers of the ANN 1110. Thus, two distinct layers may be processed in parallel by different members of the set of processing nodes. In an example, different layers of the ANN 1110 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 1160 (e.g., neurons) are trained independently. In an example, the nodes are trained on different hardware.

The number and types of UAV compliance classifications 1140 may be modified to add, remove, or modify UAV compliance classifications 1140. This may enable the ANN 1110 to be updated via software, which may enable modification of the UAV detection and mitigation system without replacing the entire system. A software update of the UAV compliance classifications 1140 may include initiating additional supervised learning based on a newly provided set of input data with associated UAV compliance classifications 1140. A software update of the UAV compliance classifications 1140 may include replacing the currently trained ANN 1110 with a separate ANN 1110 trained using a distinct set of input data or UAV compliance classifications 1140.

Figure 12:
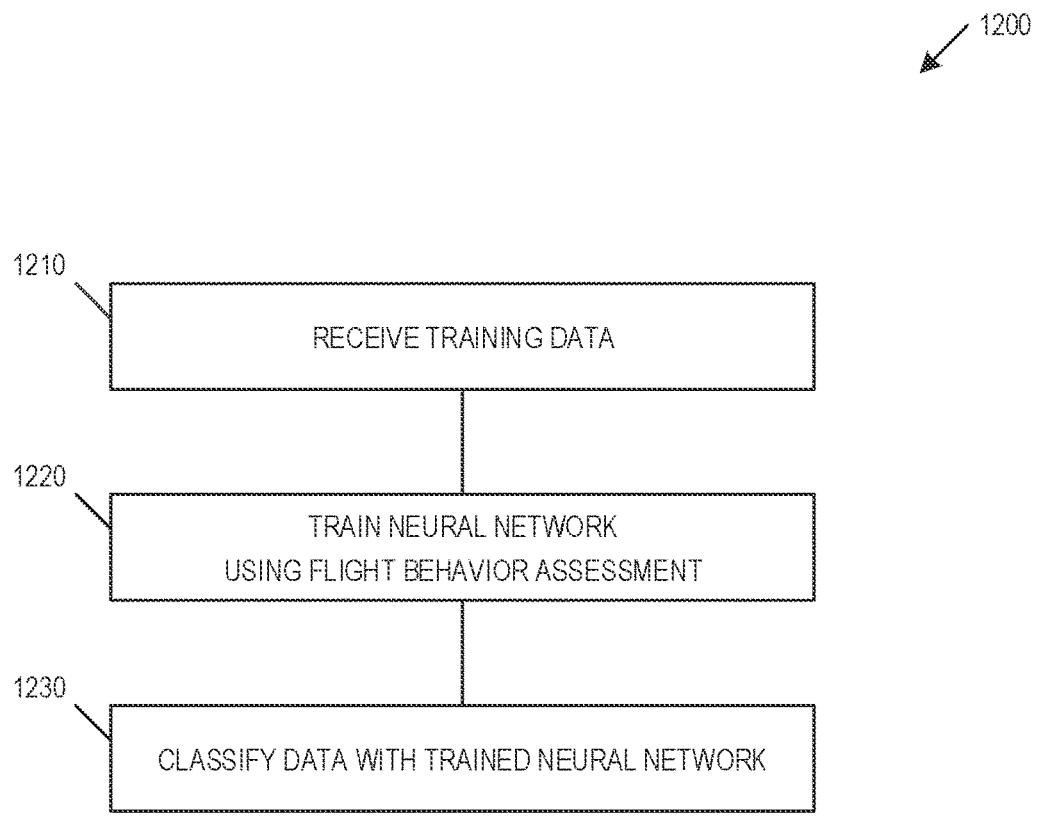
FIG. 12 illustrates a flow diagram of an example of a neural network training method for UAV detection and mitigation, according to an embodiment.

FIG. 12 illustrates a flow diagram of an example of a neural network training method 1200 for UAV detection and mitigation, according to an embodiment. The operations of the method 1200 are implemented in electronic hardware, such as that described above or below (e.g., processing circuitry). Method 1200 includes receiving 1210 a training set for a neural network, where the training set includes UAV sensor data and associated UAV compliance classifications. Here, the neural network includes a set of nodes arranged in layers and a set of inter-node weights between nodes in the set of nodes. In an example, the training set is a subset of a complete training set of UAV sensor data and associated UAV compliance classifications. Method 1200 includes iteratively training the neural network 1220 to create a trained neural network. In an example, each iteration of training the neural network is performed independently between layers of the neural network. In an example, different layers of the neural network are trained on different hardware. In an example, each iteration of the training is performed independently between nodes in the set of nodes. In an example, nodes of the neural network are trained on different hardware. Method 1200 includes classifying data 1230 using the trained neural network, such as receiving newly generated UAV sensor data and assigning a UAV compliance classification. The output of the classified data may include UAV classification selections from among those UAV compliance classifications shown in the UAV mitigation response model 300.

Figure 13:
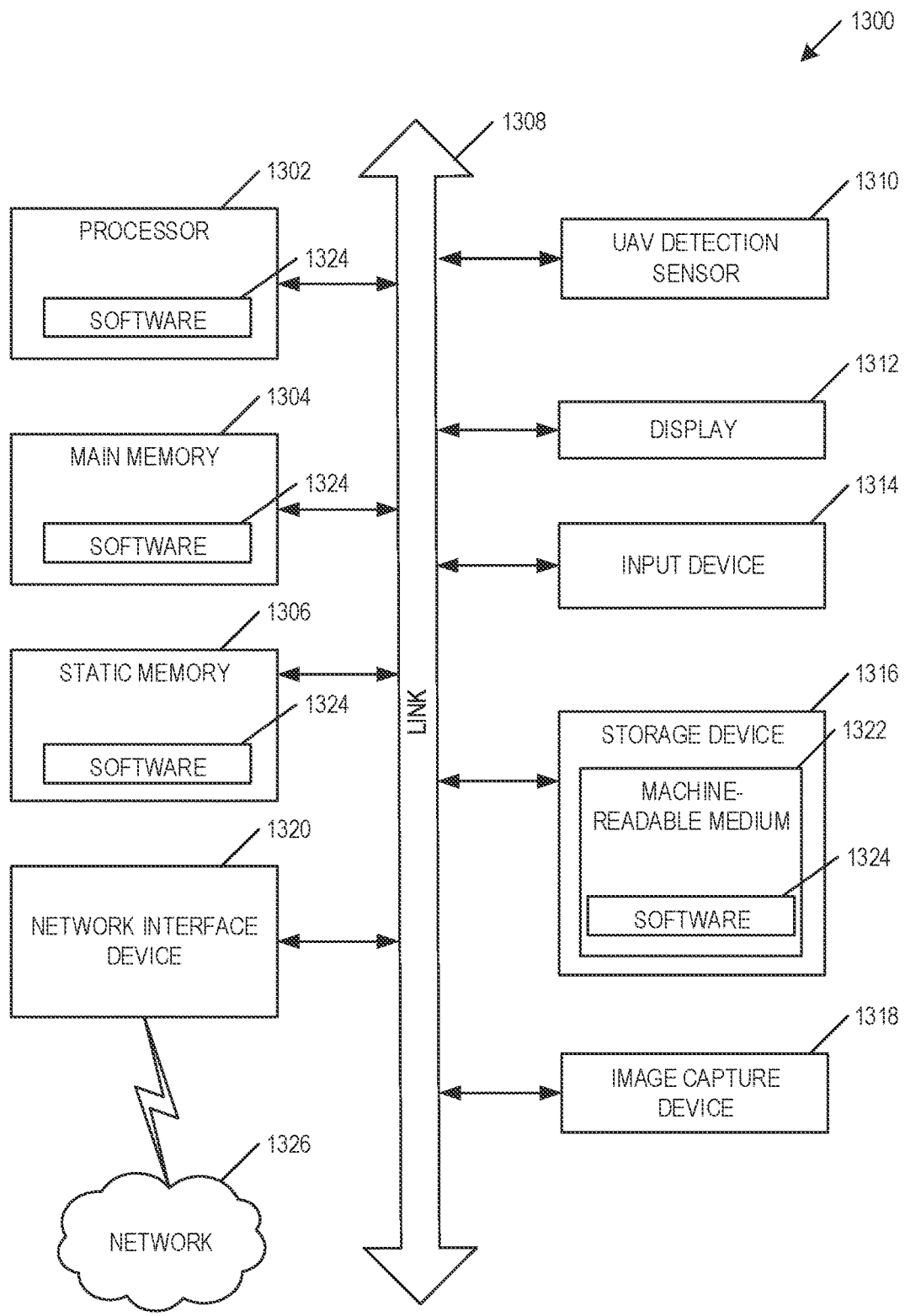
FIG. 13 is a block diagram illustrating a UAV detection and mitigation system in an example form of an electronic device, according to an example embodiment

FIG. 13 is a block diagram illustrating a UAV detection and mitigation system in an example form of an electronic device 1300, within which a set or sequence of instructions may be executed to cause the machine to perform any one of the methodologies discussed herein, according to an example embodiment. Electronic device 1300 may represent a single device or a system of multiple devices combined to provide UAV detection and mitigation. In alternative embodiments, the electronic device 1300 operates as a standalone device or may be connected (e.g., networked) to other machines. In a networked deployment, the electronic device 1300 may operate in the capacity of either a server or a client machine in server-client network environments, or it may act as a peer machine in peer-to-peer (or distributed) network environments. The electronic device 1300 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 1300 capable of executing instructions (sequential or otherwise) that specify actions to be taken by that machine to detect a user input. Further, while only a single electronic device 1300 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 1300 includes at least one processor 1302 (e.g., a central processing unit (CPU), a graphics processing unit (GPU) or both, processor cores, compute nodes, etc.), a main memory 1304 and a static memory 1306, which communicate with each other via a link 1308 (e.g., bus). The main memory 1304 or static memory 1306 may be used to store navigation data (e.g., predetermined waypoints) or payload data (e.g., stored captured images).

The electronic device 1300 may include one or more UAV detection sensors 1310, which may provide various UAV detection data to perform the detection and mitigation processes described above. The electronic device 1300 may further include a display unit 1312, where the display unit 1312 may include a single component that provides a user-readable display and a protective layer, or another display type. The electronic device 1300 may further include an input device 1314, such as a pushbutton, a keyboard, or a user interface (UI) navigation device (e.g., a mouse or touch-sensitive input). The electronic device 1300 may additionally include a storage device 1316, such as a drive unit. The electronic device 1300 may additionally include one or more image capture devices 1318 to capture images with different fields of view as described above. The electronic device 1300 may additionally include a network interface device 1320, and one or more additional sensors (not shown).

The storage device 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304, static memory 1306, or within the processor 1302 during execution thereof by the electronic device 1300. The main memory 1304, static memory 1306, and the processor 1302 may also constitute machine-readable media.

While the machine-readable medium 1322 is illustrated in an example embodiment to be a single medium, the term "machine-readable medium" may include a single medium or multiple media (e.g., a centralized or distributed database, and/or associated caches and servers) that store the one or more instructions 1324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is an aerial vehicle detection and mitigation system comprising: an aerial vehicle detection sensor to detect an aerial vehicle and determine an aerial vehicle location; one or more processors; one or more storage devices comprising instructions, which when executed by the one or more processors, configure the one or more processors to: receive the aerial vehicle location from the aerial vehicle detection sensor; determine an aerial vehicle behavior based on the aerial vehicle location; and determine an aerial vehicle response based on the aerial vehicle behavior.

In Example 2, the subject matter of Example 1 optionally includes wherein the aerial vehicle detection sensor includes at least one of a plurality of non-directional detection zone sensors, a radar sensor, and an aerial vehicle location broadcast sensor.

In Example 3, the subject matter of any one or more of Examples 1-2 optionally include wherein the determination of the aerial vehicle behavior includes determining the aerial vehicle is in a transit mode, a loiter mode, or an attack mode.

In Example 4, the subject matter of Example 3 optionally includes wherein the determination of the aerial vehicle behavior includes an aerial vehicle behavior engine stored in the one or more storage devices, the aerial vehicle behavior engine previously trained with a labeled input data set for supervised learning, the labeled input data set including a plurality of previously classified aerial vehicle detection sensor data.

In Example 5, the subject matter of Example 4 optionally includes wherein the determination of the compliance classification based on the detection data set includes training the aerial vehicle behavior engine with an unlabeled input data set for unsupervised learning, the unlabeled input data set including an aerial vehicle location data set previously generated by the aerial vehicle detection sensor.

In Example 6, the subject matter of any one or more of Examples 4-5 optionally include a behavior weighting input device to receive a behavior weighting user input, wherein the determination of the aerial vehicle behavior is further based on the behavior weighting user input.

In Example 7, the subject matter of any one or more of Examples 2-6 optionally include wherein: the plurality of non-directional detection zone sensors includes a first zone sensor and a second zone sensor; and the determination of the aerial vehicle behavior is further based on a first data set received from the first zone sensor with a second data set received from the second zone sensor.

In Example 8, the subject matter of any one or more of Examples 1-7 optionally include wherein: the aerial vehicle detection sensor includes the radar sensor; and the aerial vehicle location includes at least one of a radar vehicle range and a radar vehicle altitude.

In Example 9, the subject matter of any one or more of Examples 1-8 optionally include wherein: the aerial vehicle detection sensor includes the aerial vehicle location broadcast sensor; and the aerial vehicle location includes at least one of a broadcast vehicle range and a broadcast vehicle altitude.

In Example 10, the subject matter of Example 9 optionally includes wherein the aerial vehicle location broadcast sensor includes at least one of an automatic dependent surveillance-broadcast (ADS-B) sensor and a traffic information service-broadcast (TIS-B) sensor.

Example 11 is an aerial vehicle detection and mitigation method comprising: receiving an indication of a detection of an aerial vehicle from an aerial vehicle detection sensor: receiving an aerial vehicle location from the aerial vehicle detection sensor; determining an aerial vehicle behavior based on the aerial vehicle location; and determining an aerial vehicle response based on the aerial vehicle behavior.

In Example 12, the subject matter of Example 11 optionally includes wherein the aerial vehicle detection sensor includes at least one of a plurality of non-directional detection zone sensors, a radar sensor, and an aerial vehicle location broadcast sensor.

In Example 13, the subject matter of any one or more of Examples 11-12 optionally include wherein the determination of the aerial vehicle behavior includes determining the aerial vehicle is in a transit mode, a loiter mode, or an attack mode.

In Example 14, the subject matter of Example 13 optionally includes wherein the determination of the aerial vehicle behavior includes an aerial vehicle behavior engine stored in the one or more storage devices, the aerial vehicle behavior engine previously trained with a labeled input data set for supervised learning, the labeled input data set including a plurality of previously classified aerial vehicle detection sensor data.

In Example 15, the subject matter of Example 14 optionally includes wherein the determination of the compliance classification based on the detection data set includes training the aerial vehicle behavior engine with an unlabeled input data set for unsupervised learning, the unlabeled input data set including an aerial vehicle location data set previously generated by the aerial vehicle detection sensor.

In Example 16, the subject matter of any one or more of Examples 14-15 optionally include receiving a behavior weighting user input, wherein the determination of the aerial vehicle behavior is further based on the behavior weighting user input.

In Example 17, the subject matter of any one or more of Examples 12-16 optionally include receiving a first data set and a second data set, wherein: the aerial vehicle detection sensor includes the plurality of non-directional detection zone sensors; the plurality of non-directional detection zone sensors includes a first zone sensor and a second zone sensor; the first data set is received from the first zone sensor and the second data set is received from the second zone sensor; and the determination of the aerial vehicle behavior is further based on the first data set and the second data set.

In Example 18, the subject matter of any one or more of Examples 11-17 optionally include wherein: the aerial vehicle detection sensor includes the radar sensor; and the aerial vehicle location includes at least one of a radar vehicle range and a radar vehicle altitude.

In Example 19, the subject matter of any one or more of Examples 11-18 optionally include wherein: the aerial vehicle detection sensor includes the aerial vehicle location broadcast sensor; and the aerial vehicle location includes at least one of a broadcast vehicle range and a broadcast vehicle altitude.

In Example 20, the subject matter of Example 19 optionally includes wherein the aerial vehicle location broadcast sensor includes at least one of an automatic dependent surveillance-broadcast (ADS-B) sensor and a traffic information service-broadcast (TIS-B) sensor.

Example 21 is one or more machine-readable medium including instructions, which when executed by a computing system, cause the computing system to perform any of the methods of Examples 11-20.

Example 22 is an apparatus comprising means for performing any of the methods of Examples 11-20.

Example 23 is at least one non-transitory machine-readable storage medium, comprising a plurality of instructions that, responsive to being executed with processor circuitry of a computer-controlled device, cause the computer-controlled device to: receive an indication of a detection of an aerial vehicle from an aerial vehicle detection sensor; receive an aerial vehicle location from the aerial vehicle detection sensor; determine an aerial vehicle behavior based on the aerial vehicle location; and determine an aerial vehicle response based on the aerial vehicle behavior.

In Example 24, the subject matter of Example 23 optionally includes wherein the aerial vehicle detection sensor includes at least one of a plurality of non-directional detection zone sensors, a radar sensor, and an aerial vehicle location broadcast sensor.

In Example 25, the subject matter of any one or more of Examples 23-24 optionally include wherein the determination of the aerial vehicle behavior includes instructions further causing the computer-controlled device to determine the aerial vehicle is in a transit mode, a loiter mode, or an attack mode.

In Example 26, the subject matter of Example 25 optionally includes wherein the determination of the aerial vehicle behavior includes an aerial vehicle behavior engine stored in the one or more storage devices, the aerial vehicle behavior engine previously trained with a labeled input data set for supervised learning, the labeled input data set including a plurality of previously classified aerial vehicle detection sensor data.

In Example 27, the subject matter of Example 26 optionally includes wherein the determination of the compliance classification based on the detection data set includes instructions further causing the computer-controlled device to training the aerial vehicle behavior engine with an unlabeled input data set for unsupervised learning, the unlabeled input data set including an aerial vehicle location data set previously generated by the aerial vehicle detection sensor.

In Example 28, the subject matter of any one or more of Examples 26-27 optionally include instructions causing the computer-controlled device to receive a behavior weighting user input, wherein the determination of the aerial vehicle behavior is further based on the behavior weighting user input.

In Example 29, the subject matter of any one or more of Examples 24-28 optionally include instructions causing the computer-controlled device to receive a first data set and a second data set, wherein: the aerial vehicle detection sensor includes the plurality of non-directional detection zone sensors; the plurality of non-directional detection zone sensors includes a first zone sensor and a second zone sensor; the first data set is received from the first zone sensor and the second data set is received from the second zone sensor; and the determination of the aerial vehicle behavior is further based on the first data set and the second data set.

In Example 30, the subject matter of any one or more of Examples 23-29 optionally include wherein: the aerial vehicle detection sensor includes the radar sensor; and the aerial vehicle location includes at least one of a radar vehicle range and a radar vehicle altitude.

In Example 31, the subject matter of any one or more of Examples 23-30 optionally include wherein: the aerial vehicle detection sensor includes the aerial vehicle location broadcast sensor; and the aerial vehicle location includes at least one of a broadcast vehicle range and a broadcast vehicle altitude.

In Example 32, the subject matter of Example 31 optionally includes wherein the aerial vehicle location broadcast sensor includes at least one of an automatic dependent surveillance-broadcast (ADS-B) sensor and a traffic information service-broadcast (TIS-B) sensor.

Example 33 is an aerial vehicle detection and mitigation apparatus comprising: means for receiving an indication of a detection of an aerial vehicle from an aerial vehicle detection sensor; means for receiving an aerial vehicle location from the aerial vehicle detection sensor; means for determining an aerial vehicle behavior based on the aerial vehicle location; and means for determining an aerial vehicle response based on the aerial vehicle behavior.

In Example 34, the subject matter of Example 33 optionally includes wherein the aerial vehicle detection sensor includes at least one of a plurality of non-directional detection zone sensors, a radar sensor, and an aerial vehicle location broadcast sensor.

In Example 35, the subject matter of any one or more of Examples 33-34 optionally include wherein the determination of the aerial vehicle behavior includes determining the aerial vehicle is in a transit mode, a loiter mode, or an attack mode.

In Example 36, the subject matter of Example 35 optionally includes wherein the determination of the aerial vehicle behavior includes an aerial vehicle behavior engine stored in the one or more storage devices, the aerial vehicle behavior engine previously trained with a labeled input data set for supervised learning, the labeled input data set including a plurality of previously classified aerial vehicle detection sensor data.

In Example 37, the subject matter of Example 36 optionally includes wherein the determination of the compliance classification based on the detection data set includes training the aerial vehicle behavior engine with an unlabeled input data set for unsupervised learning, the unlabeled input data set including an aerial vehicle location data set previously generated by the aerial vehicle detection sensor.

In Example 38, the subject matter of any one or more of Examples 36-37 optionally include means for receiving a behavior weighting user input, wherein the determination of the aerial vehicle behavior is further based on the behavior weighting user input.

In Example 39, the subject matter of any one or more of Examples 34-38 optionally include means for receiving a first data set and a second data set, wherein: the aerial vehicle detection sensor includes the plurality of non-directional detection zone sensors; the plurality of non-directional detection zone sensors includes a first zone sensor and a second zone sensor; the first data set is received from the first zone sensor and the second data set is received from the second zone sensor; and the determination of the aerial vehicle behavior is further based on the first data set and the second data set.

In Example 40, the subject matter of any one or more of Examples 33-39 optionally include wherein: the aerial vehicle detection sensor includes the radar sensor; and the aerial vehicle location includes at least one of a radar vehicle range and a radar vehicle altitude.

In Example 41, the subject matter of any one or more of Examples 33-40 optionally include wherein: the aerial vehicle detection sensor includes the aerial vehicle location broadcast sensor; and the aerial vehicle location includes at least one of a broadcast vehicle range and a broadcast vehicle altitude.

In Example 42, the subject matter of Example 41 optionally includes wherein the aerial vehicle location broadcast sensor includes at least one of an automatic dependent surveillance-broadcast (ADS-B) sensor and a traffic information service-broadcast (TIS-B) sensor.

Example 43 is one or more machine-readable medium including instructions, which when executed by a machine, cause the machine to perform operations of any of the operations of Examples 1-42.

Example 44 is an apparatus comprising means for performing any of the operations of Examples 1-42.

Example 45 is a system to perform the operations of any of the Examples 1-42.

Example 46 is a method to perform the operations of any of the Examples 1-42.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. An aerial vehicle detection and mitigation system comprising:
    a first aerial vehicle detection sensor to detect an aerial vehicle and determine first aerial vehicle location;
    one or more processors; and
    one or more storage devices comprising instructions implementing an artificial neural network (ANN) aerial vehicle behavior engine, the ANN aerial vehicle behavior engine previously trained with a labeled input data set for supervised learning, the labeled input data set including a plurality of previously classified first aerial vehicle detection sensor data, which when executed by the one or more processors, configure the one or more processors to:
    determine a transit sensitivity weight based on a received transit sensitivity input value;
    determine a loiter sensitivity weight based on a received loiter sensitivity input value;
    determine an attack sensitivity weight based on a received attack sensitivity input value;
    receive the first aerial vehicle location from the first aerial vehicle detection sensor;
    probabilistically determine a first aerial vehicle behavior at the ANN aerial vehicle behavior engine based on a Markov process analysis of the first aerial vehicle location, the transit sensitivity weight, the loiter sensitivity weight, and the attack sensitivity weight; and
    determine an aerial vehicle response based on the first aerial vehicle behavior.

2. The system of claim 1, wherein:
    the first aerial vehicle detection sensor includes at least one of a plurality of non-directional detection zone sensors, a radar sensor, and a first aerial vehicle location broadcast sensor;
    the first aerial vehicle detection sensor has an associated plurality of measured location boundary values; and
    the probabilistic determination of the first aerial vehicle behavior includes comparing the first aerial vehicle location against the associated plurality of measured location boundary values.

3. The system of claim 1, wherein the probabilistic determination of the first aerial vehicle behavior includes determining the aerial vehicle is in a transit mode, a loiter mode, or an attack mode.

4. The system of claim 1, wherein the probabilistic determination of the first aerial vehicle behavior based on the labeled input data set includes training the artificial neural network aerial vehicle behavior engine with an unlabeled input data set for unsupervised learning, the unlabeled input data set including a first aerial vehicle location data set previously generated by the first aerial vehicle detection sensor.

5. The system of claim 1, further including a behavior weighting input device to receive a behavior weighting user input, wherein the probabilistic determination of the first aerial vehicle behavior is further based on the behavior weighting user input.

6. The system of claim 2, wherein:
    the plurality of non-directional detection zone sensors includes a first zone sensor and a second zone sensor; and
    the probabilistic determination of the first, aerial vehicle behavior is further based on a first data set received from the first zone sensor with a second data set received from the second zone sensor.

7. The system of claim 1, further including a second aerial vehicle detection sensor to determine a second aerial vehicle location; and the instructions further configuring the one or more processors to probabilistically determine, a second aerial vehicle behavior based on a Markov process analysis of the second aerial vehicle location the probabilistic determination of the second aerial vehicle behavior separate from the probabilistic determination of the first aerial vehicle behavior;

wherein the determination of the aerial vehicle response is further based on the second aerial vehicle behavior.

8. The system of claim 1, the instructions further configuring the one or more processors to:

prompt a system operator to approve the aerial vehicle response includes at least one of a broadcast vehicle range and a broadcast vehicle altitude;

receive a response authorization from the system operator, the response authorization indicating operator approval of the aerial vehicle response; and deploy the aerial vehicle response in response to receiving the response authorization.

9. The system of claim 8, wherein the aerial vehicle response includes at least one of an electromagnetic projectile response, a kinetic projectile response, and armor defensive response, and a smoke screen defensive response.

10. An aerial vehicle detection and mitigation method comprising:

receiving an indication of a detection of an aerial vehicle from first aerial vehicle detection sensor;

receiving a first aerial vehicle location from the first aerial vehicle detection sensor;

determine a transit sensitivity weight based on a received transit sensitivity input value;

determine a loiter sensitivity weight based on a received loiter sensitivity input value;

determine an attack sensitivity weight based on a received attack sensitivity input value;

probabilistically determining a first aerial vehicle behavior at an artificial neural network (ANN) aerial vehicle behavior engine based on a Markov process analysis of the first aerial vehicle location, the transit sensitivity weight, the loiter sensitivity weight and the attack sensitivity weight, wherein the ANN aerial vehicle behavior engine is previously trained with a labeled input data set for supervised learning, the labeled input data set including a plurality of previously classified first aerial vehicle detection sensor data; and determining an aerial vehicle response based on the first aerial vehicle behavior.

11. The method of claim 10, wherein:

the first aerial vehicle detection sensor includes at least one of a plurality of non-directional detection zone sensors, a radar sensor, and a first aerial vehicle location broadcast sensor;

the first aerial vehicle detection sensor has an associated plurality of measured location boundary values; and the probabilistic determination of the first aerial vehicle behavior includes comparing the first aerial vehicle location against the associated plurality of measured location boundary values.

12. The method of claim 10, wherein the probabilistic determination of the first aerial vehicle behavior includes determining the aerial vehicle is in a transit mode, a loiter mode, or an attack mode.

13. The method of claim 10, further including receiving a behavior weighting user input, wherein the probabilistic determination of the first aerial vehicle behavior is further based on the behavior weighting user input.

14. The method of claim 11, further including receiving a first data set and a second data set, wherein:

the first aerial vehicle detection sensor includes the plurality of non-directional detection zone sensors;

the plurality of non-directional detection zone sensors includes a first zone sensor and a second zone sensor;

the first data set is received from the first zone sensor and the second data set is received from the second zone sensor; and the probabilistic determination of the first aerial vehicle behavior is further based on the first data set and the second data set.

15. At least one non-transitory machine-readable storage medium, comprising a plurality of instructions that, responsive to being executed with processor circuitry of a computer-controlled device, cause the computer-controlled device to:

receive an indication of a detection of an aerial vehicle from a first aerial vehicle detection sensor;

receive a first aerial vehicle location from the first aerial vehicle detection sensor;

determine a transit sensitivity weight based on a received transit sensitivity input value;

determine a loiter sensitivity weight based on a received loiter sensitivity input value;

determine an attack sensitivity weight based on a received attack sensitivity input value;

probabilistically determine a first aerial vehicle behavior at an artificial neural network (ANN) aerial vehicle behavior engine based on the first aerial vehicle location, the transit sensitivity weight, the loiter sensitivity weight, and the attack sensitivity weight, wherein the ANN aerial vehicle behavior engine is previously trained with a labeled input data set for supervised learning, the labeled input data set including a plurality of previously classified first aerial vehicle detection sensor data; and determine an aerial vehicle response based on the first aerial vehicle behavior.

16. The non-transitory machine-readable storage medium of claim 15, wherein the probabilistic determination of the first aerial vehicle behavior includes instructions further causing the computer-controlled device to determine the aerial vehicle is in a transit mode, a loiter mode, or an attack mode.

17. The non-transitory machine-readable storage medium of claim 15, further including instructions causing the computer-controlled device to receive a behavior weighting user input, wherein the probabilistic determination of the first aerial vehicle behavior is further based on the behavior weighting user input.

* * * * *